(12) United States Patent
Sick

(10) Patent No.: US 11,987,939 B2
(45) Date of Patent: May 21, 2024

(54) ARTIFICIAL TURF AND PRODUCTION METHOD

(71) Applicant: Polytex Sportbelage Produktions-GmbH, Grefrath (DE)

(72) Inventor: Stephan Sick, Willich-Neersen (DE)

(73) Assignee: Polytex Sportbeläge Produktions—GmbH, Grefrath (DE)

( * ) Notice: Subject to any disclaimer, the term of this patent is extended or adjusted under 35 U.S.C. 154(b) by 39 days.

(21) Appl. No.: 17/539,551

(22) Filed: Dec. 1, 2021

(65) Prior Publication Data
US 2022/0161477 A1  May 26, 2022

Related U.S. Application Data

(63) Continuation-in-part of application No. 15/129,456, filed as application No. PCT/EP2014/056149 on Mar. 27, 2014, now abandoned.

(51) Int. Cl.
*E01C 13/08* (2006.01)
*B29C 48/00* (2019.01)
(Continued)

(52) U.S. Cl.
CPC .......... *E01C 13/08* (2013.01); *B29C 48/0018* (2019.02); *B29C 48/022* (2019.02);
(Continued)

(58) Field of Classification Search
CPC ... E01C 13/08; Y10T 428/23993; D02G 3/02; D01F 1/10; D01F 6/46; D01F 6/90;
(Continued)

(56) References Cited

U.S. PATENT DOCUMENTS 5,212,239 A  5/1993  Mallikarjun
5,278,231 A  1/1994  Chundury
(Continued)

FOREIGN PATENT DOCUMENTS

EP  0658640 A1  6/1995
EP  3122942 A1  2/2017
(Continued)

OTHER PUBLICATIONS

U.S. Office Action dated Jun. 16, 2022 for corresponding U.S. Appl. No. 15/129,456.
(Continued)

*Primary Examiner* — Cheryl Juska
(74) *Attorney, Agent, or Firm* — Harness, Dickey & Pierce, P.L.C.

(57) ABSTRACT

The invention provides for a method of manufacturing artificial turf (1000). The method includes creating a polymer mixture, such as polymer mixture (400), where the polymer mixture is at least a three-phase system. The polymer mixture includes a first polymer, a second polymer and a compatibilizer. The first polymer is a polyamide (PA) and the second polymer is a polyethylene (PE). The first polymer is included in an amount of 0.125 percent to 5 percent by weight, the second polymer is included in an amount of 60 percent to 97 percent by weight and the compatibilizer is included in an amount of 0.375 percent to 15 percent by weight. The first polymer and the second polymer are immiscible, and the first polymer forms polymer beads surrounded by the compatibilizer within the second polymer.

11 Claims, 10 Drawing Sheets

(51) Int. Cl.

| | | |
|---|---|---|
| B29C 48/05 | (2019.01) | |
| B29C 48/21 | (2019.01) | |
| B29C 48/88 | (2019.01) | |
| D01D 5/088 | (2006.01) | |
| D01D 5/098 | (2006.01) | |
| D01F 1/10 | (2006.01) | |
| D01F 8/06 | (2006.01) | |
| D01F 8/12 | (2006.01) | |
| D02G 3/02 | (2006.01) | |
| D05C 15/04 | (2006.01) | |
| D05C 17/02 | (2006.01) | |
| D06N 7/00 | (2006.01) | |
| D06N 7/02 | (2006.01) | |
| B29K 23/00 | (2006.01) | |
| B29K 105/26 | (2006.01) | |

(52) U.S. Cl.
CPC ............ *B29C 48/05* (2019.02); *B29C 48/21* (2019.02); *B29C 48/911* (2019.02); *B29C 48/919* (2019.02); *D01D 5/0885* (2013.01); *D01D 5/098* (2013.01); *D01F 1/10* (2013.01); *D01F 8/06* (2013.01); *D01F 8/12* (2013.01); *D02G 3/02* (2013.01); *D05C 15/04* (2013.01); *D05C 17/02* (2013.01); *D06N 7/0065* (2013.01); *E01C 13/083* (2013.01); *B29K 2023/0625* (2013.01); *B29K 2105/26* (2013.01); *D06N 2201/0254* (2013.01); *D06N 2201/10* (2013.01); *D10B 2505/202* (2013.01)

(58) Field of Classification Search
CPC .... D01F 6/92; D01F 8/06; D01F 8/12; D01D 5/098; D01D 5/0885; D01D 5/088; D10B 2321/021; D10B 2321/022; D10B 2331/02; D10B 2505/202; D06N 7/0065; D06N 2201/0254; D06N 2201/10; D05C 15/04; D05C 17/02; B29C 48/022; B29C 48/0018; B29C 48/05; B29C 48/911; B29C 48/919; B29K 2023/0625
See application file for complete search history.

(56) References Cited

U.S. PATENT DOCUMENTS

| | | |
|---|---|---|
| 5,534,335 A | 7/1996 | Everhart et al. |
| 5,587,118 A | 12/1996 | Mallonee |
| 5,597,650 A | 1/1997 | Mallonee |
| 5,620,797 A | 4/1997 | Mallonee |
| 5,667,890 A | 9/1997 | Ballard et al. |
| 5,759,925 A | 6/1998 | Ballard et al. |
| 5,811,040 A | 9/1998 | Mallonee |
| 5,936,039 A | 8/1999 | Wang et al. |
| 11,015,268 B2 * | 5/2021 | Sick .................... D01F 8/12 |
| 11,608,572 B2 * | 3/2023 | Sick .................... D01D 5/098 |
| 2004/0086664 A1 | 5/2004 | Seaton |
| 2004/0180200 A1 | 9/2004 | Bertamini et al. |
| 2005/0038185 A1 | 2/2005 | Sullivan |
| 2006/0159917 A1 * | 7/2006 | Verleyen ............. E01C 13/08 428/364 |
| 2008/0214699 A1 | 9/2008 | Halahmi et al. |
| 2011/0217498 A1 | 9/2011 | Halahmi et al. |
| 2011/0301262 A1 | 12/2011 | Halahmi et al. |
| 2012/0107527 A1 | 5/2012 | Auffermann |
| 2013/0216736 A1 * | 8/2013 | Sandkuehler ......... D01F 6/46 428/17 |
| 2013/0237111 A1 | 9/2013 | Crown et al. |
| 2013/0267664 A1 | 10/2013 | Jeol |
| 2017/0051453 A1 | 2/2017 | Sick et al. |
| 2017/0265547 A1 | 9/2017 | Sick et al. |
| 2018/0177254 A1 * | 6/2018 | Neuman ............... B29C 48/17 |
| 2019/0100857 A1 * | 4/2019 | Sick .................... D01F 6/46 |
| 2019/0177882 A1 * | 6/2019 | Sick .................... D01D 5/36 |
| 2020/0240050 A1 * | 7/2020 | Sick .................... B29B 9/06 |
| 2020/0291549 A1 * | 9/2020 | Sick .................... D02G 1/16 |
| 2020/0291583 A1 * | 9/2020 | Sick .................... C08K 3/08 |
| 2020/0308777 A1 * | 10/2020 | Sick .................... D01D 5/253 |
| 2020/0308778 A1 * | 10/2020 | Sick .................... D01D 5/36 |
| 2020/0340144 A1 * | 10/2020 | Sick .................... D02J 1/22 |
| 2021/0238771 A1 * | 8/2021 | Sick .................... D06N 7/0065 |

FOREIGN PATENT DOCUMENTS

| | | | | |
|---|---|---|---|---|
| EP | 3467168 A1 | | 4/2019 | |
| EP | 3604637 A1 | | 2/2020 | |
| JP | S49103722 U | * | 9/1974 | |
| JP | S54139227 A | | 10/1979 | |
| JP | H09119036 A | | 5/1997 | |
| JP | H09220781 A | | 8/1997 | |
| KR | 101962320 B1 | | 7/2019 | |
| WO | WO-2018077850 A1 | * | 5/2018 | ............ D01F 6/46 |
| WO | WO-2019086624 A1 | * | 5/2019 | ............ D01D 5/247 |

OTHER PUBLICATIONS

U.S. Office Action dated Mar. 29, 2022 for corresponding U.S. Appl. No. 15/129,456.
International Search Report PCT/ISA/210 for International Application No. PCT/EP2014/056149 dated Mar. 27, 2014.
Written Opinion of the International Searching Authority PCT/ISA/237 for International Application No. PCT/EP2014/056149 dated Mar. 27, 2014.
International Preliminary Report on Patentability PCT/IPEA/416 for International Application No. PCT/EP2014/056149 dated Mar. 27, 2014.
Australian Examination Report for Application No. 2014388095 dated Feb. 7, 2018.
Australian Examination Report issued in Application No. 2014388095 dated May 30, 2018.
Second Chinese Office Action issued in Application No. 201480006624.2 dated Sep. 12, 2018, English translation thereof.
"Immiscible Polymer Blends," Polymer Science Learning Center, Dept. of Polymer Science, University of Southern Mississippi, https://web.archive.org/web/20130727101114/https://psic.ws/macrog/iblend.htm, Jul. 27, 2013.
G. Odian, Principles of Polymerization, 1981, Wiley-Interscience, 2nd ed., section1-5a, Crystalline and Amorphous Behavior, p. 25, 1st paragraph and section 1-5b, Determinants of Polymer Crystallinity, p. 29, 1st paragraph.
Lee, Jae-Dong et al., "Effects of Mixing Procedures on Properties of Compatibilized Polypropylene/Nylon 6 Blends," mid-Dec. 1995, Polymer Engineering and Science, vol. 35, No. 23, pp. 1821-1833.
JP 09-220781 A machine translation by J-PlatPat, Aug. 26, 1997 (Year: 1997).
Definitions of "drawing" and "spinning", Complete Textile Glossary, 2001, Celanese Acetate, pp. 49 and 147.
Wagner et al., Extrusion: The Definitive Processing Guide and Handbook, 2013, Elsevier Inc., 2nd Edition, pp. 585-591.
https://textilestudycenter.com/man-made-fibre-production/, Apr. 11, 2015.
Final Office Action dated Oct. 29, 2021 for corresponding U.S. Appl. No. 15/129,456.
Non Final Office Action dated Aug. 3, 2021 for corresponding U.S. Appl. No. 15/129,456.
Final Office Action dated Feb. 8, 2021 for corresponding U.S. Appl. No. 15/129,456.
Non Final Office Action dated Mar. 8, 2018 for corresponding U.S. Appl. No. 15/129,456.
Office Action dated Sep. 4, 2020 for corresponding U.S. Appl. No. 15/129,456.
Decision to Grant a European Patent Application No. 14714659.1, dated Dec. 7, 2017.
International Search Report and Written Opinion dated Mar. 17,

(56) References Cited

OTHER PUBLICATIONS 2023 issued in related international patent application No. PCT/EP2022/083867.

\* cited by examiner

ARTIFICIAL TURF AND PRODUCTION METHOD

CROSS-REFERENCE TO RELATED APPLICATIONS

This application is a continuation-in-part of U.S. application Ser. No. 15/129,456, filed Sep. 27, 2016, which is a national phase under 35 U.S.C. § 371 of PCT International Application No. PCT/EP2014/056149 which has an International filing date of Mar. 27, 2014, the entire contents of each of which are hereby incorporated by reference.

FIELD OF THE INVENTION

The invention relates to artificial turf and the production of artificial turf which is also referred to as synthetic turf. The invention further relates to the production of fibers that imitate grass, and in particular a product and a production method for artificial turf fibers based on polymer blends and of the artificial turf carpets made from these artificial turf fibers.

BACKGROUND AND RELATED ART

Artificial turf or artificial grass is surface that is made up of fibers which is used to replace grass. The structure of the artificial turf is designed such that the artificial turf has an appearance which resembles grass. Typically artificial turf is used as a surface for sports such as soccer, American football, rugby, tennis, golf, for playing fields, or exercise fields. Furthermore artificial turf is frequently used for landscaping applications.

An advantage of using artificial turf is that it eliminates the need to care for a grass playing or landscaping surface, like regular mowing, scarifying, fertilizing and watering. Watering can be e.g. difficult due to regional restrictions for water usage. In other climatic zones the re-growing of grass and re-formation of a closed grass cover is slow compared to the damaging of the natural grass surface by playing and/or exercising on the field. Artificial turf fields though they do not require a similar attention and effort to be maintained, may require some maintenance such as having to be cleaned from dirt and debris and having to be brushed regularly. This may be done to help fibers stand-up after being stepped down during the play or exercise. Throughout the typical usage time of 5-15 years it may be beneficial if an artificial turf sports field can withstand high mechanical wear, can resist UV, can withstand thermal cycling or thermal ageing, can resist inter-actions with chemicals and various environmental conditions. It is therefore beneficial if the artificial turf has a long usable life, is durable, and keeps its playing and surface characteristics as well as appearance throughout its usage time.

United States Patent application US 2010/0173102 A1 discloses an artificial grass that is characterized in that the material for the cladding has a hydrophilicity which is different from the hydrophilicity of the material which is used for the core.

SUMMARY

The invention provides for a method of manufacturing artificial turf in the independent claims. Embodiments are given in the dependent claims.

In one aspect the invention provides for a method of manufacturing artificial turf carpet. The method comprises the step of creating a polymer mixture. The polymer mixture as used herein encompasses a mixture of different types of polymers and also possibly with various additives added to the polymer mixture. The term 'polymer mixture' may also be replaced with the term 'master batch' or 'compound batch'. The polymer mixture is at least a three-phase system. A three-phase system as used herein encompasses a mixture that separates out into at least three distinct phases. The polymer mixture comprises a first polymer, a second polymer, and a compatibilizer. These three items form the phases of the three-phase system. If there are additional polymers or compatibilizers added to the system then the three-phase system may be increased to a four, five, or more phase system. The first polymer and the second polymer are immiscible. The first polymer forms polymer beads surrounded by the compatibilizer within the second polymer.

The method further comprises the step of extruding the polymer mixture into a monofilament. To perform this extrusion the polymer mixture may for instance be heated. The method further comprises the step of quenching the monofilament. In this step the monofilament is cooled. The method further comprises the step of reheating the monofilament. The method further comprises the step of stretching the reheated filament to deform the polymer beads into thread-like regions and to form the monofilament into an artificial turf fiber. In this step the monofilament is stretched. This causes the monofilament to become longer and in the process the polymer beads are stretched and elongated. Depending upon the amount of stretching the polymer beads are elongated more.

The method further comprises the step of incorporating the artificial turf fiber into an artificial turf backing. In some examples the artificial turf backing is a textile or a textile matt.

The incorporation of the artificial turf fiber into the artificial turf backing could for example be performed by tufting the artificial turf fiber into an artificial turf backing and binding the tufted artificial turf fibers to the artificial turf backing. For instance the artificial turf fiber may be inserted with a needle into the backing and tufted the way a carpet may be. If loops of the artificial turf fiber are formed then may be cut during the same step. The method further comprises the step of binding the artificial turf fibers to the artificial turf backing. In this step the artificial turf fiber is bound or attached to the artificial turf backing. This may be performed in a variety of ways such as gluing or coating the surface of the artificial turf backing to hold the artificial turf fiber in position. This for instance may be done by coating a surface or a portion of the artificial turf backing with a material such as latex or polyurethane.

The incorporation of the artificial turf fiber into the artificial turf backing could for example be performed alternatively by weaving the artificial turf fiber into artificial turf backing (or fiber mat) during manufacture of the artificial turf carpet. This technique of manufacturing artificial turf is known from United States patent application US 20120125474 A1.

The term 'polymer bead' or 'beads' may refer to a localized region, such as a droplet, of a polymer that is immiscible in the second polymer. The polymer beads may in some instances be round or spherical or oval-shaped, but they may also be irregularly-shaped. In some instances the polymer bead will typically have a size of approximately 0.1 to 3 micrometer, preferably 1 to 2 micrometer in diameter. In other examples the polymer beads will be larger. They may for instance have a size with a diameter of a maximum of 50 micrometer.

In some examples the stretched monofilament may be used directly as the artificial turf fiber. For example the monofilament could be extruded as a tape or other shape.

In other examples the artificial turf fiber may be a bundle or group of several stretched monofilament fibers is in general cabled, twisted, or bundled together. In some cases the bundle is rewound with a so called rewinding yarn, which keeps the yarn bundle together and makes it ready for the later tufting or weaving process.

The monofilaments may for instance have a diameter of 50-600 micrometer in size. The yarn weight may typically reach 50-3000 dtex.

Embodiments may have the advantage that the second polymer and any immiscible polymers may not delaminate from each other. The thread-like regions are embedded within the second polymer. It is therefore impossible for them to delaminate. The use of the first polymer and the second polymer enables the properties of the artificial turf fiber to be tailored. For instance a softer plastic may be used for the second polymer to give the artificial turf a more natural grass-like and softer feel. A more rigid plastic may be used for the first polymer or other immiscible polymers to give the artificial turf more resilience and stability and the ability to spring back after being stepped or pressed down.

A further advantage may possibly be that the thread-like regions are concentrated in a central region of the monofilament during the extrusion process. This leads to a concentration of the more rigid material in the center of the monofilament and a larger amount of softer plastic on the exterior or outer region of the monofilament. This may further lead to an artificial turf fiber with more grass-like properties.

A further advantage may be that the artificial turf fibers have improved long term elasticity. This may require reduced maintenance of the artificial turf and require less brushing of the fibers because they more naturally regain their shape and stand up after use or being trampled.

In another embodiment the polymer bead comprises crystalline portions and amorphous portions. The polymer mixture was likely heated during the extrusion process and portions of the first polymer and also the second polymer may have a more amorphous structure or a more crystalline structure in various regions. Stretching the polymer beads into the thread-like regions may cause an increase in the size of the crystalline portions relative to the amorphous portions in the first polymer. This may lead for instance to the first polymer to become more rigid than when it has an amorphous structure. This may lead to an artificial turf with more rigidity and ability to spring back when pressed down. The stretching of the monofilament may also cause in some cases the second polymer or other additional polymers also to have a larger portion of their structure become more crystalline.

In a specific example of this the first polymer could be polyamide and the second polymer could be polyethylene. Stretching the polyamide will cause an increase in the crystalline regions making the polyamide stiffer. This is also true for other plastic polymers.

In another embodiment the creating of the polymer mixture comprises the step of forming a first mixture by mixing the first polymer with the compatibilizer. The creation of the polymer mixture further comprises the step of heating the first mixture. The step of creating the polymer mixture further comprises the step of extruding the first mixture. The creating of the polymer mixture further comprises the step of extruding the first mixture. The creation of the polymer mixture further comprises the steps of granulating the extruded first mixture. The creating of the polymer mixture further comprises the step of mixing the granulated first mixture with the second polymer. The creation of the polymer mixture further comprises the step of heating the granulated first mixture with the second polymer to form the polymer mixture. This particular method of creating the polymer mixture may be advantageous because it enables very precise control over how the first polymer and compatibilizer are distributed within the second polymer. For instance the size or shape of the extruded first mixture may determine the size of the polymer beads in the polymer mixture.

In the aforementioned method of creating the polymer mixture for instance a so called one-screw extrusion method may be used. As an alternative to this the polymer mixture may also be created by putting all of the components that make it up together at once. For instance the first polymer, the second polymer and the compatibilizer could be all added together at the same time. Other ingredients such as additional polymers or other additives could also be put together at the same time. The amount of mixing of the polymer mixture could then be increased for instance by using a two-screw feed for the extrusion. In this case the desired distribution of the polymer beads can be achieved by using the proper rate or amount of mixing.

In another embodiment the polymer mixture is at least a four-phase system. The polymer mixture comprises at least a third polymer. The third polymer is immiscible with the second polymer. The third polymer further forms the polymer beads surrounded by the compatibilizer within the second polymer.

In another embodiment the creating of the polymer mixture comprises the step of forming a first mixture by mixing the first polymer and the third polymer with the compatibilizer. The creating of the polymer mixture further comprises the step of heating the first mixture. The creating of the polymer mixture first comprises the step of extruding the first mixture. The creating of the polymer mixture further comprises the step of granulating the extruded first mixture. The creating of the polymer mixture further comprises mixing the first mixture with the second polymer. The creating of the polymer mixture further comprises the step of heating the first mixture with the second polymer to form the polymer mixture. This method may provide for a precise means of making the polymer mixture and controlling the size and distribution of the polymer beads using two different polymers. As an alternative the first polymer could be used to make a granulate with the compatibilizer separately from making the third polymer with the same or a different compatibilizer. The granulates could then be mixed with the second polymer to make the polymer mixture.

As an alternative to this the polymer mixture could be made by adding the first polymer, a second polymer, the third polymer and the compatibilizer all together at the same time and then mixing them more vigorously. For instance a two-screw feed could be used for the extruder.

In another embodiment the third polymer is a polar polymer.

In another embodiment the third polymer is polyamide.

In another embodiment the third polymer is polyethylene terephthalate, which is also commonly abbreviated as PET.

In another embodiment the third polymer is polybutylene terephthalate, which is also commonly abbreviated as PBT.

In another embodiment the polymer mixture comprises between 1% and 30% by weight the first polymer and the third polymer combined. In this example the balance of the weight may be made up by such components as the second polymer, the compatibilizer, and any other additional additives put into the polymer mixture.

In another embodiment the polymer mixture comprises between 1 and 20% by weight of the first polymer and the third polymer combined. Again, in this example the balance of the weight of the polymer mixture may be made up by the second polymer, the compatibilizer, and any other additional additives.

In another embodiment the polymer mixture comprises between 5% and 10% by weight of the first polymer and the third polymer combined. Again in this example the balance of the weight of the polymer mixture may be made up by the second polymer, the compatibilizer, and any other additional additives.

In another embodiment the polymer mixture comprises between 1% and 30% by weight the first polymer. In this example the balance of the weight may be made up for example by the second polymer, the compatibilizer, and any other additional additives.

In another embodiment the polymer mixture comprises between 1% and 20% by weight of the first polymer. In this example the balance of the weight may be made up by the second polymer, the compatibilizer, and any other additional additives mixed into the polymer mixture.

In another embodiment the polymer mixture comprises between 5% and 10% by weight of the first polymer. This example may have the balance of the weight made up by the second polymer, the compatibilizer, and any other additional additives mixed into the polymer mixture.

In another embodiment the first polymer is a polar polymer.

In another embodiment the first polymer is polyamide.

In another embodiment the first polymer is polyethylene terephthalate which is commonly known by the abbreviation PET.

In another embodiment the first polymer is polybutylene terephthalate which is also known by the common abbreviation PBT.

In another embodiment the second polymer is a non-polar polymer.

In another embodiment the second polymer is polyethylene.

In another embodiment the second polymer is polypropylene.

In another embodiment the second polymer is a mixture of the aforementioned polymers which may be used for the second polymer.

In another embodiment the compatibilizer is any one of the following: a maleic acid grafted on polyethylene or polyamide; a maleic anhydride grafted on free radical initiated graft copolymer of polyethylene, SEBS, EVA, EPD, or polypropylene with an unsaturated acid or its anhydride such as maleic acid, glycidyl methacrylate, ricinoloxazoline maleinate; a graft copolymer of SEBS with glycidyl methacrylate, a graft copolymer of EVA with mercaptoacetic acid and maleic anhydride; a graft copolymer of EPDM with maleic anhydride; a graft copolymer of polypropylene with maleic anhydride; a polyolefin-graft-polyamidepolyethylene or polyamide; and a polyacrylic acid type compatibilizer.

In another embodiment the polymer mixture comprises between 80-90% by weight of the second polymer. In this example the balance of the weight may be made up by the first polymer, possibly the second polymer if it is present in the polymer mixture, the compatibilizer, and any other chemicals or additives added to the polymer mixture.

In another embodiment the polymer mixture further comprises any one of the following: a wax, a dulling agent, a ultraviolet stabilizer, a flame retardant, an anti-oxidant, a pigment, and combinations thereof. These listed additional components may be added to the polymer mixture to give the artificial turf fibers other desired properties such as being flame retardant, having a green color so that the artificial turf more closely resembles grass and greater stability in sunlight.

In another embodiment creating the artificial turf fiber comprises weaving the monofilament into the artificial turf fiber. That is to say in some examples the artificial turf fiber is not a single monofilament but a combination of a number of fibers.

In another embodiment the artificial turf fiber is a yarn.

In another embodiment the method further comprises bundling stretched monofilaments together to create the artificial turf fiber.

In another embodiment the method further comprises weaving, bundling, or spinning multiple monofilaments together to create the artificial turf fiber. Multiple, for example 4 to 8 monofilaments, could be formed or finished into a yarn.

In another aspect the invention provides for an artificial turf manufacture according to any one of the aforementioned methods.

In another aspect the invention provides for an artificial turf comprising an artificial turf backing and artificial turf fiber tufted into the artificial turf backing. The artificial turf backing may for instance be a textile or other flat structure which is able to have fibers tufted into it. The artificial turf fiber comprises at least one monofilament. Each of the at least one monofilament comprises a first polymer in the form of thread-like regions. Each of the at least one monofilament comprises a second polymer, wherein the thread-like regions are embedded in the second polymer. Each of the at least one monofilaments comprises a compatibilizer surrounding each of the thread-like regions and separating the at least one first polymer from the second polymer. This artificial turf may have the advantage of being extremely durable because the thread-like regions are embedded within the second polymer via a compatibilizer. They therefore do not have the ability to delaminate. Having the second polymer surrounding the first polymer may provide for a stiff artificial turf that is soft and feels similar to real turf. The artificial turf as described herein is distinct from artificial turf which is coextruded. In coextrusion a core of typically 50 to 60 micrometer may be surrounded by an outer cover or sheathing material which has a diameter of approximately 200 to 300 micrometer in diameter. In this artificial turf there is a large number of thread-like regions of the first polymer. The thread-like regions may not continue along the entire length of the monofilament. The artificial turf may also have properties or features which are provided for by any of the aforementioned method steps.

In another embodiment the thread-like regions have a diameter of less than 20 micrometer.

In another embodiment the thread-like regions have a diameter of less than 10 micrometer.

In another embodiment the thread-like regions have a diameter of between 1 and 3 micrometer.

In another embodiment the artificial turf fiber extends a predetermined length beyond the artificial turf backing. The thread-like regions have a length less than one half of the predetermined length.

In another embodiment the thread-like regions have a length of less than 2 mm.

According to another embodiment of the present disclosure, which may be combined with one or more of the previously described embodiments, a method of manufacturing artificial turf includes creating a polymer mixture, where the polymer mixture is at least a three-phase system. The polymer mixture includes a first polymer, a second polymer and a compatibilizer. The first polymer is a polyamide (PA) and the second polymer is a polyethylene (PE). The first polymer is included in an amount of 0.125 percent to 5 percent by weight, the second polymer is included in an amount of 60 percent to 97 percent by weight and the compatibilizer is included in an amount of 0.375 percent to 15 percent by weight. The first polymer and the second polymer are immiscible, and the first polymer forms polymer beads surrounded by the compatibilizer within the second polymer.

In one preferred embodiment, the polyamide is nylon (e.g., nylon 6). However, the scope of the present disclosure includes other polyamides, and include polyamides that occur both naturally and artificially. For example, the polyamide of the present disclosure may include naturally occurring polyamides (i.e., proteins), such as wool and silk, and artificially made polyamides, such as aramids, and sodium poly(aspartate), for example.

In another preferred embodiment, the second polymer is a polyethylene, such as a polyethylene resin produced by DOW®. However, the scope of the present disclosure covers other polyethylenes, such as bio-polyethylenes (i.e., polyethylenes produced/provided from renewable resources rather than fossil fuels). For example, the scope of the present disclosure includes polyethylenes produced from sugarcane, in which high-density and low-density polyethylenes are produced from bioethanol derived from sugarcane. Embodiments of the present disclosure also contemplate polyethylene made from other feedstocks, such as wheat grain and sugar beet.

A high compatibilizer content of the PA-PE polymer mixture, and preferably the high compatibilizer content of the PA-PE polymer mixture having a first polymer included in an amount of 0.125 percent to 5 percent by weight, a second polymer included in an amount of 60 percent to 97 percent by weight and a compatibilizer included in an amount of 0.375 percent to 15 percent by weight, has the technical effect of changing the flow properties of the mixture, making the mass of the mixture more homogeneous, thereby making the pressure and temperature of the mixture more uniform during processing of the mixture and avoiding fluctuations in energy consumption, as well as eliminating segregation of the mixture upon and after extruding the mixture through a nozzle plate or die. The compatibilizer and the first polymer (e.g. polyamide) may be present in the formulation in a determined ratio of about 5 parts to 1 part (5:1 parts) to about 2:1 parts, and more preferable in a determined ratio of from about 4:1 to 2.5:1 and even more preferable in a determined ratio of about 3:1.

According to one embodiment, the compatibilizer preferably comprises an ethylene ethyl acrylate (i.e., copolymers consisting of basic resins produced by the catalytic copolymerization of ethylene and ethyl acrylate). According to another embodiment, the compatibilizer comprises a maleic acid anhydride. Embodiments of the polymer mixture of the present disclosure have the technical effect of faster detachment at a nozzle plate and/or die (i.e., faster detachment upon extruding the mixture through a nozzle plate and/or die), or in other words, provide an extrusion step that generates monofilaments more efficiently and more uniformly and/or with less wasted material, and may also provide the technical effects of the artificial turf fiber having an increased polarity, better abrasion resistance, better elongation at break, good resilience and tensile strength, better suitability for incorporation into an artificial turf backing and/or better suitability as field hockey yarn. Furthermore, the inventive polymer mixture, including the ethylene ethyl acrylate compatibilizer, also has the technical effects of optimizing service life of the artificial turf fiber manufacturing machinery, and in particular extending the service life and/or use of the extrusion machinery and/or components, such as nozzle plates and/or dies, for example, and extending periods between cleaning of such components (e.g., ultrasound cleaning). For example, embodiments of the polymer mixture as disclosed increases the period between nozzle and/or die cleanings from 2-3 days, when using an anhydride compatibilizer, to 2-3 weeks when using a ethylene ethyl acrylate compatibilizer.

In another embodiment, creating the polymer mixture includes the steps of forming a first mixture by mixing the first polymer with the compatibilizer, heating the first mixture, extruding the first mixture, granulating the extruded first mixture, mixing the granulated first mixture with the second polymer, and heating the granulated first mixture with the second polymer to form the polymer mixture.

In another embodiment, the method may further include extruding the polymer mixture into a monofilament, quenching the monofilament, reheating the monofilament, and stretching the reheated monofilament to deform the polymer beads into fibrous regions and to form the monofilament into an artificial turf fiber. The fibrous regions include the first polymer and are at least partially surrounded by the compatibilizer and separated from the second polymer by the compatibilizer.

The fibrous regions are centrally located such that the fibrous regions do not delaminate after formation. The method may also further include incorporating the artificial turf fiber into an artificial turf backing.

In yet another embodiment, the polyethylene of the second polymer includes at least a first linear low-density polyethylene (LLDPE) and a second LLDPE. The first LLDPE has a melt flow rate from about 0.9 g/10 min to about 1.1 g/10 min as measured in accordance with DIN EN ISO 1133 190° C./2.16 kg, and the second LLDPE has a melt flow rate from about 2.2 g/10 min to about 2.4 g/10 min as measured in accordance with DIN EN ISO 1133 190° C./2.16 kg. Suitable example embodiments of are LLDPEs manufactured by DOW®.

In one embodiment, the first LLDPE and the second LLDPE each have a density from about 0.90 g/cm$^3$ to about 0.93 g/cm$^3$, preferably each from about 0.91 g/cm$^3$ to about 0.925 g/cm$^3$. According to an embodiment, the first LLDPE has a density of 0.917 g/cm$^3$ and the second LLDPE has a density of 0.922 g/cm$^3$.

In another embodiment, it is preferable that the first LLDPE and the second LLDPE are present in the formulation in a determined ratio of about 1 part to 20 parts (1:20 parts) to about 1:2 parts, and more preferable in a determined ratio of from about 1:20 to 1:3. The preferred ratios have the technical effect of reducing the separation of PA, which is important for giving the product a proper final abrasion resistance. The preferred ratios ensure that the melt flow index (MFI) of the formulation (i.e., the mixture) is close to the optimum MFI, which in one embodiment corresponds to the MFI of the second LLDPE. Separation is particularly relevant in the event of a pressure drop at the extrusion nozzle plate and/or die.

In one embodiment, the weight ratio of the first LLDPE to the second LLDPE is between 1:20 and 1:3, and the melt flow rate of the mixture of the first LLDPE and the second LLDPE is from about 1.95 g/10 min to about 2.25 g/10 min as measured in accordance with DIN EN ISO 1133 190° C./2.16 kg.

According to another embodiment, the polyethylene of the second polymer further includes a high-density polyethylene (HDPE). The HDPE has a melt flow rate from about 3.9 g/10 min to about 4.1 g/10 min as measured in accordance with DIN EN ISO 1133 190° C./2.16 kg, and the HDPE is included in an amount of 0.1 percent by weight to 15 percent by weight. Furthermore, in another embodiment, the HDPE has a density from about 0.93 g/cm$^3$ to about 0.97 g/cm$^3$, preferably from about 0.95 g/cm$^3$ to about 0.96 g/cm$^3$.

In one embodiment, the polymer mixture further includes a processing aid additive. The processing aid additive has the technical effect of lowering the viscosity of the polymer mixture (also referred to as processing mixture melt) during processing to reduce or prevent deposits from accumulating on extruder components, such as extruder screws, extruder housing and nozzle and/or die plates. The processing aid additive may include a fluoropolymer based processing additive, a siloxane, or a combination thereof. The processing aid additive may be included in an amount of 0.1 percent by weight to 1.0 percent by weight.

Conventional processing aid additives, such as products from BYK-Altana and 3M (e.g., Dynamar®) contain long chain polyfluorinated polymers, such as long-chain polyfluoroalkylated compounds. Although there are current environmental concerns about the use of short chain polyfluorinated polymers (e.g., short chain polyfluoroalkyl substances (PFAS)), it is difficult to analytically distinguish long chain polyfluorinated polymers from short chain polyfluorinated polymers, and consequently only the presence of fluorine is tested for in artificial turf fibers. When the presence of fluorine is detected, regulator typically conclude that short-chain PFASs are likely present, at least as impurities. Thus, one advantage of only using siloxane as a processing aid additive, besides having a fluorine-free formulation and fluorine-free product, is the elimination of any doubt about whether or not the formulation and product contain short chain polyfluorinated polymers, thereby alleviating any concerns that the product is detrimental to the environment.

In one preferred embodiment, the processing aid additive of the present disclosure is siloxane. In another embodiment, the siloxane is included in the polymer mixture in an amount of 0.5 wt %, resulting in a fluorine-free mixture and fiber product. In addition to addressing environmental/toxicological concerns, the use of siloxanes as a processing aid additive may also reduce deposits that can occur during processing of a PA-PE blend (i.e., mixture). Although the compatibilizer may reduce deposits, as described above, deposits may still build up on components of processing machinery, such as components associated with the extrusion process. Using only a siloxane formulation has the technical effect of increasing the die and/or nozzle life from about 24 hours to up to 72 hours.

In yet another embodiment, the polymer mixture may further include a polymer protection mixture having at least one of a hindered amine light stabilizer, an anti-oxidant, an oxygen scavenger, a third LLDPE, and/or fillers and pigments. The polymer protection mixture may be included in an amount of 3.0 percent to 15.0 percent by weight. In one embodiment, the protection mixture may be included in about 10 weight percent of the polymer mixture, and the protection mixture itself may include: (1) 14% by weight of: hindered amine light stabilizer, anti-oxidant and oxygen scavenger; (2) 45-65% by weight a third LLDPE (e.g., a polymeric carrier); and (3) 31-41% by weight fillers and pigments.

In another embodiment, the polymer mixture consists of 0.125 percent to 5 percent by weight of the first polymer, 0.375 percent to 15 percent by weight of the compatibilizer, 3 percent to 15 percent by weight of a polymer protection mixture including at least one of a hindered amine light stabilizer, an anti-oxidant, an oxygen scavenger, a third LLDPE, fillers and pigments, and 0.1 percent to 1.0 percent by weight of an processing aid additive. The processing aid additive is a fluoropolymer based processing additive, a siloxane or a combination thereof. The second polymer consists of 20 percent to 75 percent by weight of a first linear low-density polyethylene (LLDPE), where the first LLDPE has a melt flow rate from about 0.9 g/10 min to about 1.1 g/10 min as measured in accordance with DIN EN ISO 1133 190° C./2.16 kg, 5 percent to 25 percent by weight of a second LLDPE, where the second LLDPE has a melt flow rate from about 2.2 g/10 min to about 2.4 g/10 min as measured in accordance with DIN EN ISO 1133 190° C./2.16 kg, and 0.01 percent to 15 percent by weight of a high-density polyethylene (HDPE), the HDPE having a melt flow rate from about 3.9 g/10 min to about 4.1 g/10 min as measured in accordance with DIN EN ISO 1133 190° C./2.16 kg.

According to yet another embodiment, the polymer mixture consists of 0.25 percent to 2.5 percent by weight of the first polymer, 0.75 percent to 7.5 percent by weight of the compatibilizer, 4 percent to 11 percent by weight of a polymer protection mixture including at least one of a hindered amine light stabilizer, an anti-oxidant, an oxygen scavenger, a third LLDPE, fillers and pigments, and 0.15 percent to 0.75 percent by weight of an processing aid additive, where the processing aid additive is a fluoropolymer based processing additive, a siloxane or a combination thereof. The second polymer consists of 55 percent to 70 percent by weight of a first linear low-density polyethylene (LLDPE), the first LLDPE having a melt flow rate from about 0.9 g/10 min to about 1.1 g/10 min as measured in accordance with DIN EN ISO 1133 190° C./2.16 kg, 10 percent to 20 percent by weight of a second LLDPE, the second LLDPE having a melt flow rate from about 2.2 g/10 min to about 2.4 g/10 min as measured in accordance with DIN EN ISO 1133 190° C./2.16 kg, and 8 percent to 14 percent by weight of a high-density polyethylene (HDPE), the HDPE having a melt flow rate from about 3.9 g/10 min to about 4.1 g/10 min as measured in accordance with DIN EN ISO 1133 190° C./2.16 kg.

In one embodiment, the polymer beads include crystalline portions and amorphous portions, where stretching the polymer beads into fibrous (i.e., threadlike) regions causes an increase in the size of the crystalline portions relative to the amorphous portions.

According to an embodiment of the present disclosure, the monofilament includes a round bulge including a core (e.g., a cylindrical core) and two protrusions extending from the round bulge. In another embodiment, the step of extruding the polymer mixture into a monofilament includes coextruding the polymer mixture with a liquid cladding polymer component. Upon coextrusion, the polymer mixture forms the cylindrical core and the liquid cladding polymer component forms a cladding encompassing the core.

In one embodiment, the cladding has a non-circular profile. The scope of the present disclosure includes opposite facing and/or non-opposite facing protrusions of the cladding. In an embodiment, a profile of at least one of the protrusions includes a concave side. However, the scope of the present disclosure includes protrusions or portions of protrusions having profiles with non-concave sides (e.g., convex sides or straight sides).

In general, the core-cladding structure may have the advantage that the core may be optimized to provide properties, such as a certain degree of elasticity or rigidity, which are desirable for each blade of artificial turf as a whole, while the cladding can be designed with specific surface properties such as softness and visual appearance. Particularly, the core may comprise a core polymer and/or a thread polymer which provides sufficient rigidity to the artificial turf fiber that the desired resilience of artificial turf blades manufactured from these artificial turf fibers are achieved. For the particular case that a soft cladding polymer is selected and the core polymer is the same polymer as the cladding polymer, the resilience of the artificial turf fiber arises from the threadlike regions alone and the thread polymer should be chosen accordingly.

The miscibility of the core polymer and the cladding polymer may render additional interfacing materials for providing a sufficient amount of cohesion between core and cladding unnecessary. During manufacturing from a fluid state, the core polymer and the cladding polymer may mix with each other, forming a quasi-monolithic transition zone between core and cladding which provides a mechanical stability which is comparable to mono-component fibers.

The non-circular profile of the cladding may increase the surface-to-mass ratio for each artificial turf fiber compared to purely circular-cylindrical fibers if a suitable non-circular geometry is selected. An artificial turf manufactured from these artificial turf fibers may thus feature an improved coverage per unit area, which would conventionally be achieved by manufacturing the artificial turf with a higher blade density. According to embodiments of the invention, the improved coverage can be achieved with lower polymer consumption, which may result in reduced manufacturing costs.

According to another embodiment of the present disclosure, the monofilament includes a round bulge and two protrusions extending from the round bulge. In one embodiment, the shape of the monofilament, including the round bulge and the two protrusions are formed upon extrusion of the mixture through a nozzle plate or die.

Each monofilament may be a cylindrical polymer fiber, where the term "cylindrical" denotes a general right cylinder, i.e. having its primary axis oriented perpendicular to its base plane or cross section. Specifically, each fiber produced can be a non-circular cylinder, i.e. having a non-circular cross section. Examples of a non-circular cross section include an ellipse or a polygon. It is understood that the cross sections of core and cladding may be selected independently from each other, and that each of the core and the cladding may have a non-circular cross section. In a non-limiting example, an elliptical core is surrounded by a bean-shaped cladding. In another non-limiting example, the fiber has a circular core and a cladding with two protrusions extending away from the core with a length of at least the core diameter.

According to embodiments, the profile of at least one of the protrusions comprises an undulated section spanning at least 60% of one side of said at least one protrusion. An undulated section is understood here as a part of the fiber profile which comprises a repetitive element that is small compared to overall dimensions of the fiber. For the scope of the present disclosure, this is considered to be the case if at least two instances (i.e. one repetition) of the repetitive element fit on each of the at least one undulated protrusion, and its amplitude, for each of the at least one undulated protrusion, is not more than 25 percent of a maximum thickness of said protrusion.

Undulation may increase the surface-to-mass ratio further and therefore contribute to the benefits mentioned above. Another advantageous effect may be an increase in diffuse light scattering of artificial turf produced from artificial turf fibers with the undulated profile compared to fibers having a smooth surface. In addition, undulation may increase resilience of the fiber. Undulation may also decrease adhesion of liquids (e.g. rain water) to the fiber by providing guiding edges to droplets, i.e. undulation may increase fiber surface while decreasing liquid contact surface. Artificial turf produced from artificial turf fibers with the undulated profile may therefore be produced more efficiently and have a shorter drying time during usage.

According to embodiments, the undulated section spans one side of the non-circular profile and the non-circular profile comprises no further undulated sections apart from the undulated side. In an example, the fiber is double-sided, comprising one smooth face (smooth side of the profile, e.g. straight or concave) and one grooved face (undulated side). In addition to the aforementioned general advantages of undulation, a single-sided undulation may be a closer approach to blade structures found with natural grass, which may contribute beneficially to the properties of an artificial turf manufactured with such fibers. In such artificial turf, a portion of the grooved face of each fiber may be surfacing the turf in a stochastic distribution. This may give the turf a less homogeneous and matted appearance. In addition, using such turf e.g. for athletic activities may locally give the artificial grass blades a defined orientation, such that the oriented contact area becomes easily discernable from its stochastically oriented environment.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
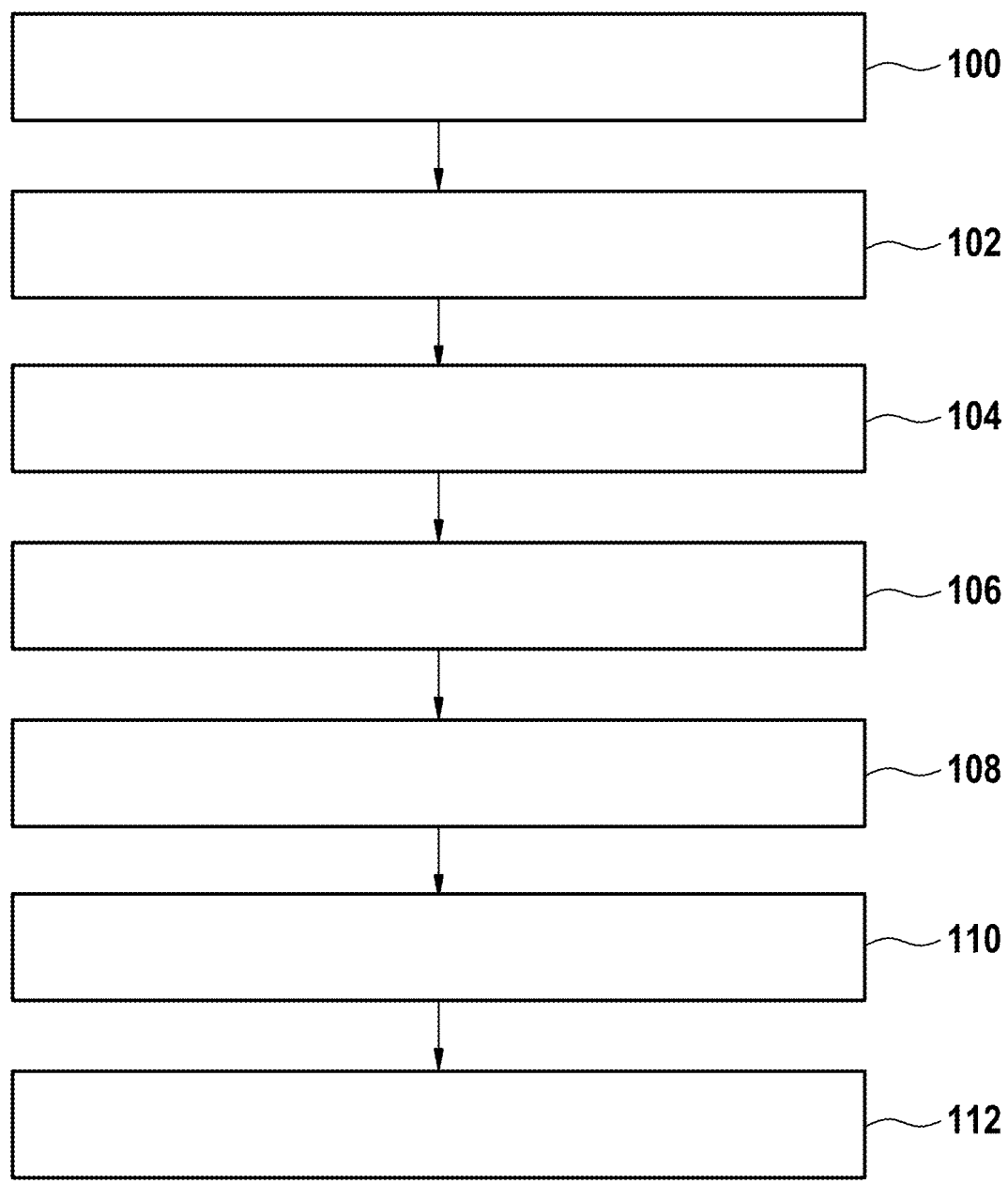
FIG. 1 shows a flowchart which illustrates an example of a method of manufacturing artificial turf.

FIG. 1 shows a flowchart which illustrates an example of a method of manufacturing artificial turf. First in step 100 a polymer mixture is created. The polymer mixture is at least a three-phase system. The polymer mixture comprises a first polymer. The polymer mixture further comprises a second polymer and a compatibilizer. The first polymer and the second polymer are immiscible. In other examples there may be additional polymers such as a third, fourth, or even fifth polymer that are also immiscible with the second polymer. There also may be additional compatibilizers which are used either in combination with the first polymer or the additional third, fourth, or fifth polymer. The first polymer forms polymer beads surrounded by the compatibilizer. The polymer beads may also be formed by additional polymers which are not miscible in the second polymer.

The polymer beads are surrounded by the compatibilizer and are within the second polymer or mixed into the second polymer. In the next step 102 the polymer mixture is extruded into a monofilament. Next in step 104 the monofilament is quenched or rapidly cooled down. Next in step 106 the monofilament is reheated. In step 108 the reheated monofilament is stretched to deform the polymer beads into thread-like regions and to form the monofilament into the artificial turf fiber. Additional steps may also be performed on the monofilament to form the artificial turf fiber. For instance the monofilament may be spun or woven into a yarn with desired properties. Next in step 110 the artificial turf fiber is incorporated into an artificial turf backing. Step 110 could for example be, but is not limited to, tufting or weaving the artificial turf fiber into the artificial turf backing. Then in step 112 the artificial turf fibers are bound to the artificial turf backing. For instance the artificial turf fibers may be glued or held in place by a coating or other material. Step 112 is an optional step. For example if the artificial turf fibers are woven into the artificial turf backing step 112 may not need to be performed.

Figure 2:
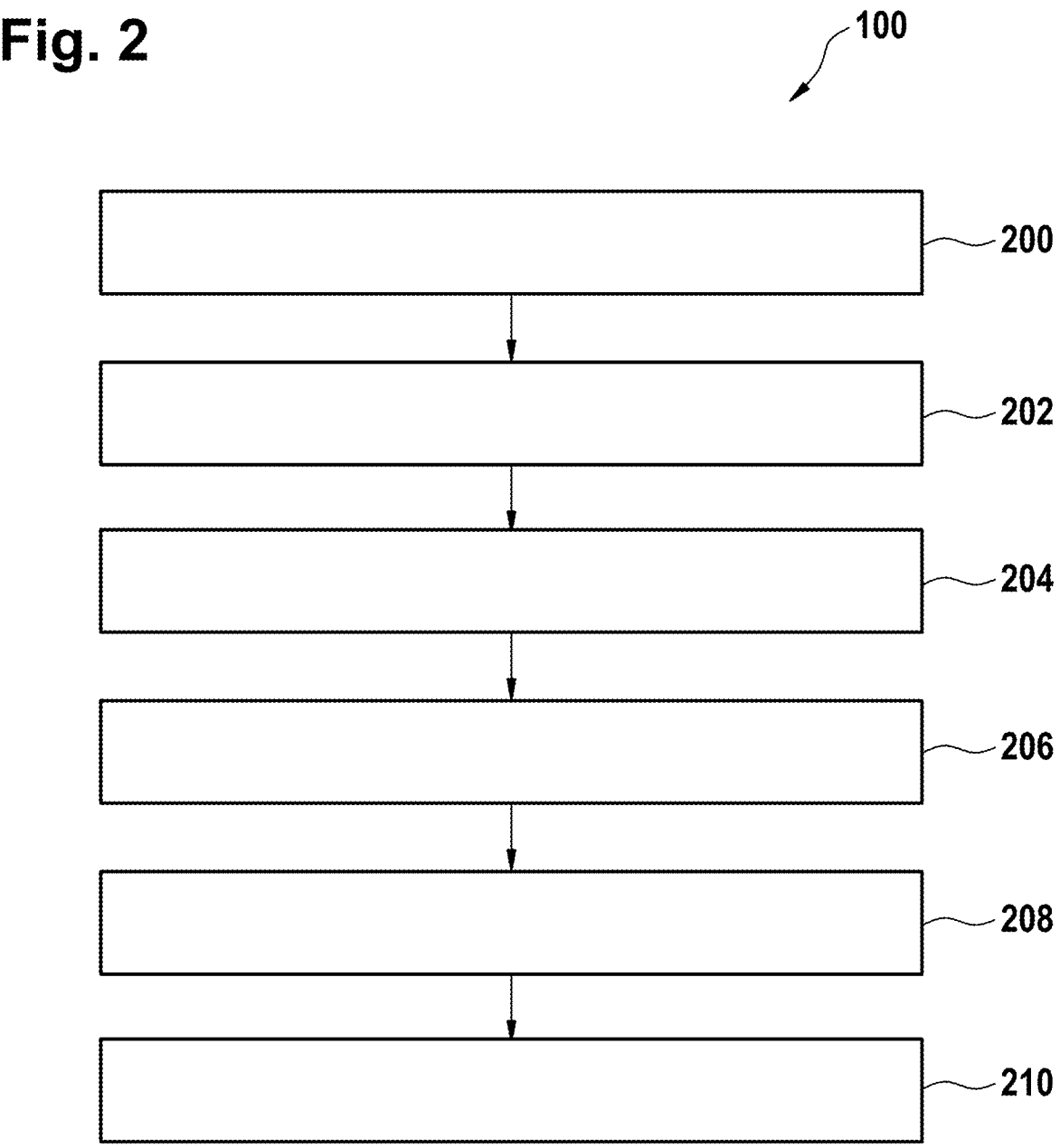
FIG. 2 shows a flowchart which illustrates one method of creating the polymer mixture.

FIG. 2 shows a flowchart which illustrates one method of creating the polymer mixture. In this example the polymer mixture is a three-phase system and comprises the first polymer, a second polymer and the compatibilizer. The polymer mixture may also comprise other things such as additives to color or provide flame or UV-resistance or improve the flowing properties of the polymer mixture. First in step 200 a first mixture is formed by mixing the first polymer with the compatibilizer. Additional additives may also be added during this step. Next in step 202 the first mixture is heated. Next in step 204 the first mixture is extruded. Then in step 206 the extruded first mixture is then granulated or chopped into small pieces. Next in step 208 the granulated first mixture is mixed with the second polymer. Additional additives may also be added to the polymer mixture at this time. Finally in step 210 the granulated first mixture is heated with the second polymer to form the polymer mixture. The heating and mixing may occur at the same time.

Figure 3:
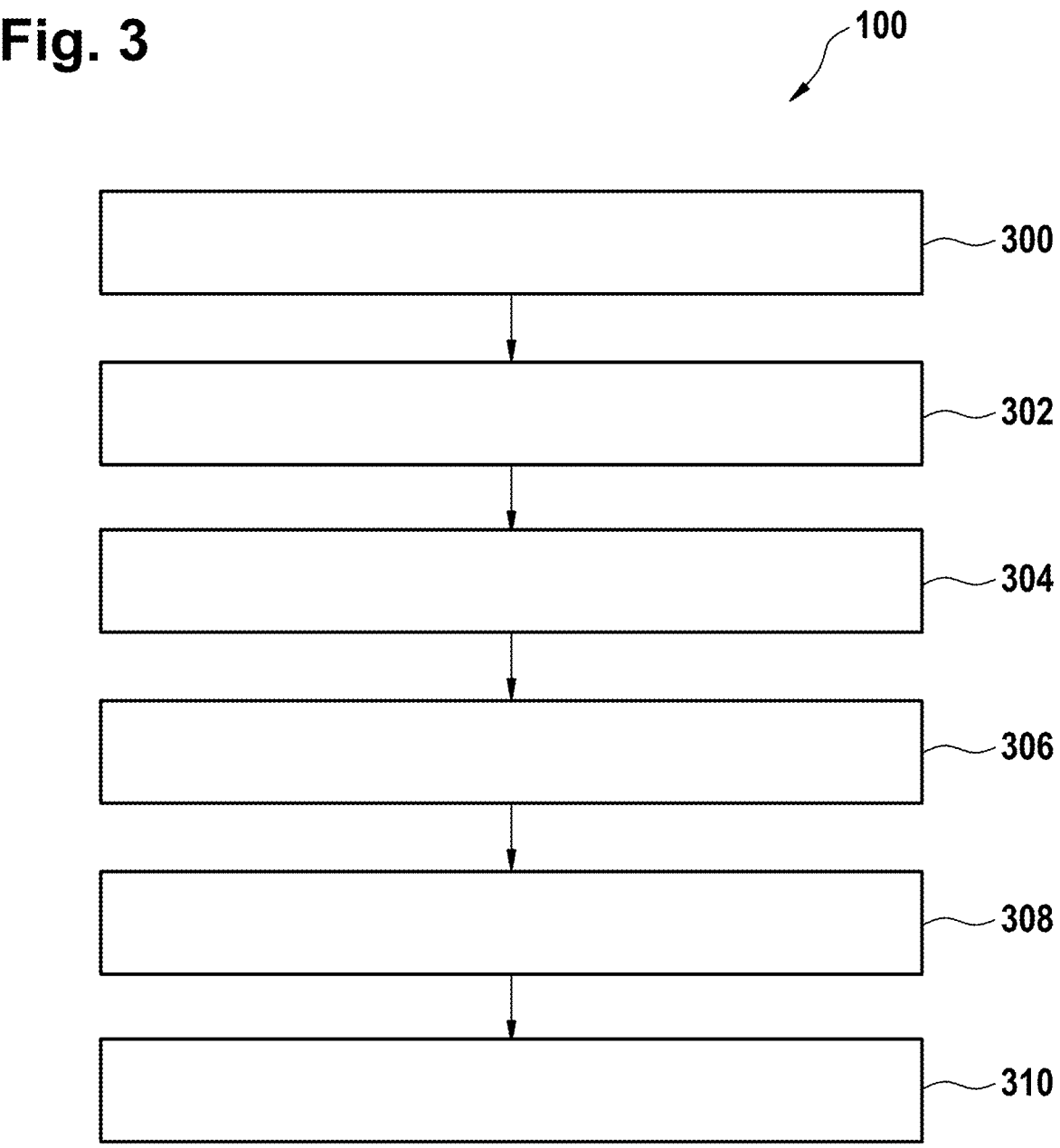
FIG. 3 shows a flowchart which illustrates a further example of how to create a polymer mixture.

FIG. 3 shows a flowchart which illustrates a further example of how to create a polymer mixture 100. In this example the polymer mixture additionally comprises at least a third polymer. The third polymer is immiscible with the second polymer and the polymer mixture is at least a four-phase system. The third polymer further forms the polymer beads surrounded by the compatibilizer with the second polymer. First in step 300 a first mixture is formed by mixing the first polymer and the third polymer with the compatibilizer. Additional additives may be added to the first mixture at this point. Next in step 302 the first mixture is heated. The heating and the mixing of the first mixture may be done at the same time. Next in step 304 the first mixture is extruded. Next in step 306 the extruded first mixture is granulated or chopped into tiny pieces. Next in step 308 the first mixture is mixed with the second polymer. Additional additives may be added to the polymer mixture at this time. Then finally in step 310 the heated first mixture and the second polymer are heated to form the polymer mixture. The heating and the mixing may be done simultaneously.

Figure 4:
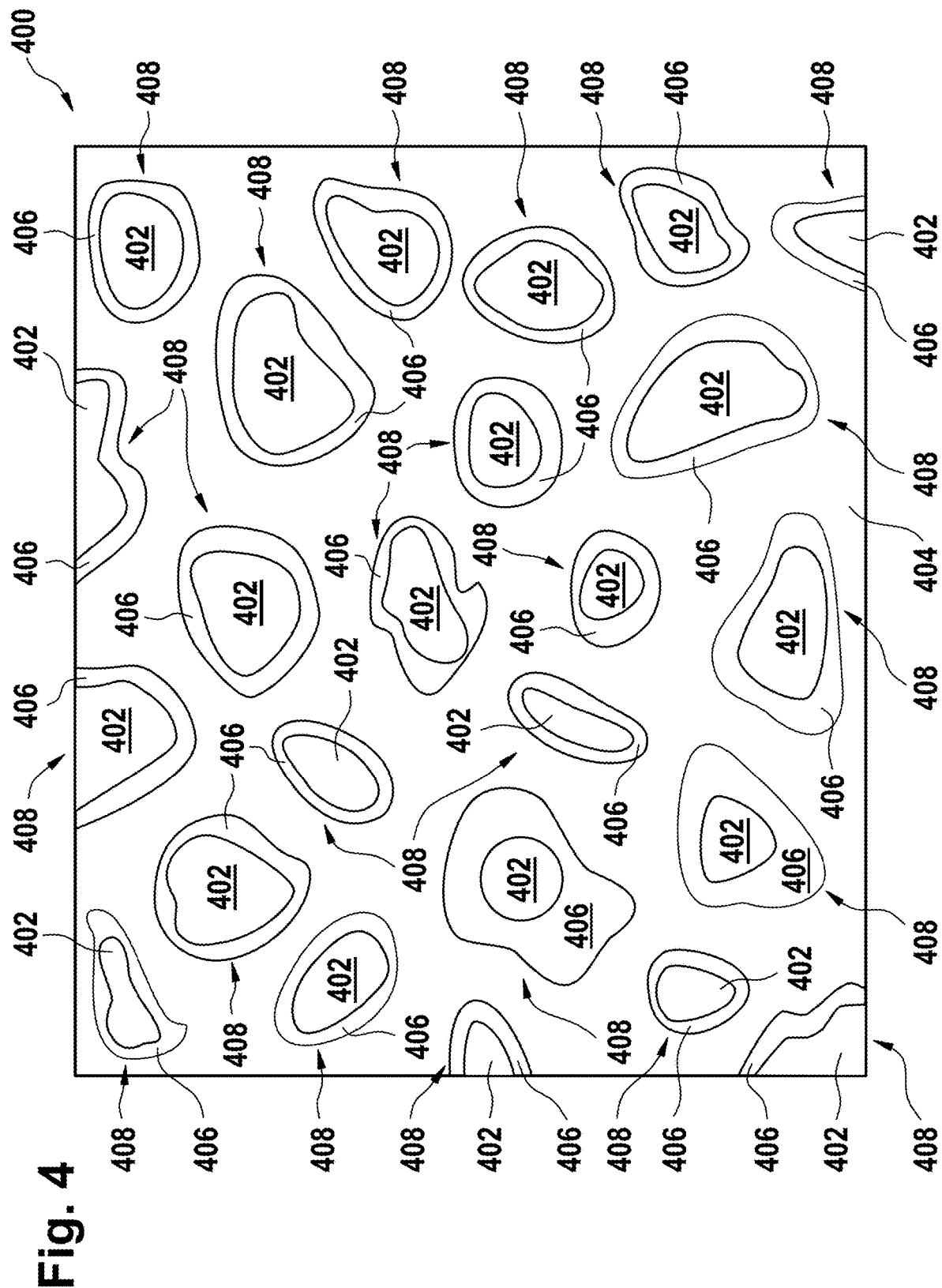
FIG. 4 shows a diagram which illustrates a cross-section of a polymer mixture.

FIG. 4 shows a diagram which illustrates a cross-section of a polymer mixture 400. The polymer mixture 400 comprises a first polymer 402, a second polymer 404, and a compatibilizer 406. The first polymer 402 and the second polymer 404 are immiscible. The first polymer 402 is less abundant than the second polymer 404. The first polymer 402 is shown as being surrounded by compatibilizer 406 and being dispersed within the second polymer 404. The first polymer 402 surrounded by the compatibilizer 406 forms a number of polymer beads 408. The polymer beads 408 may be spherical or oval in shape or they may also be irregularly-shaped depending up on how well the polymer mixture is mixed and the temperature. The polymer mixture 400 is an example of a three-phase system. The three phases are the regions of the first polymer 402. The second phase region is the compatibilizer 406 and the third phase region is the second polymer 404. The compatibilizer 406 separates the first polymer 402 from the second polymer 406.

Figure 5:
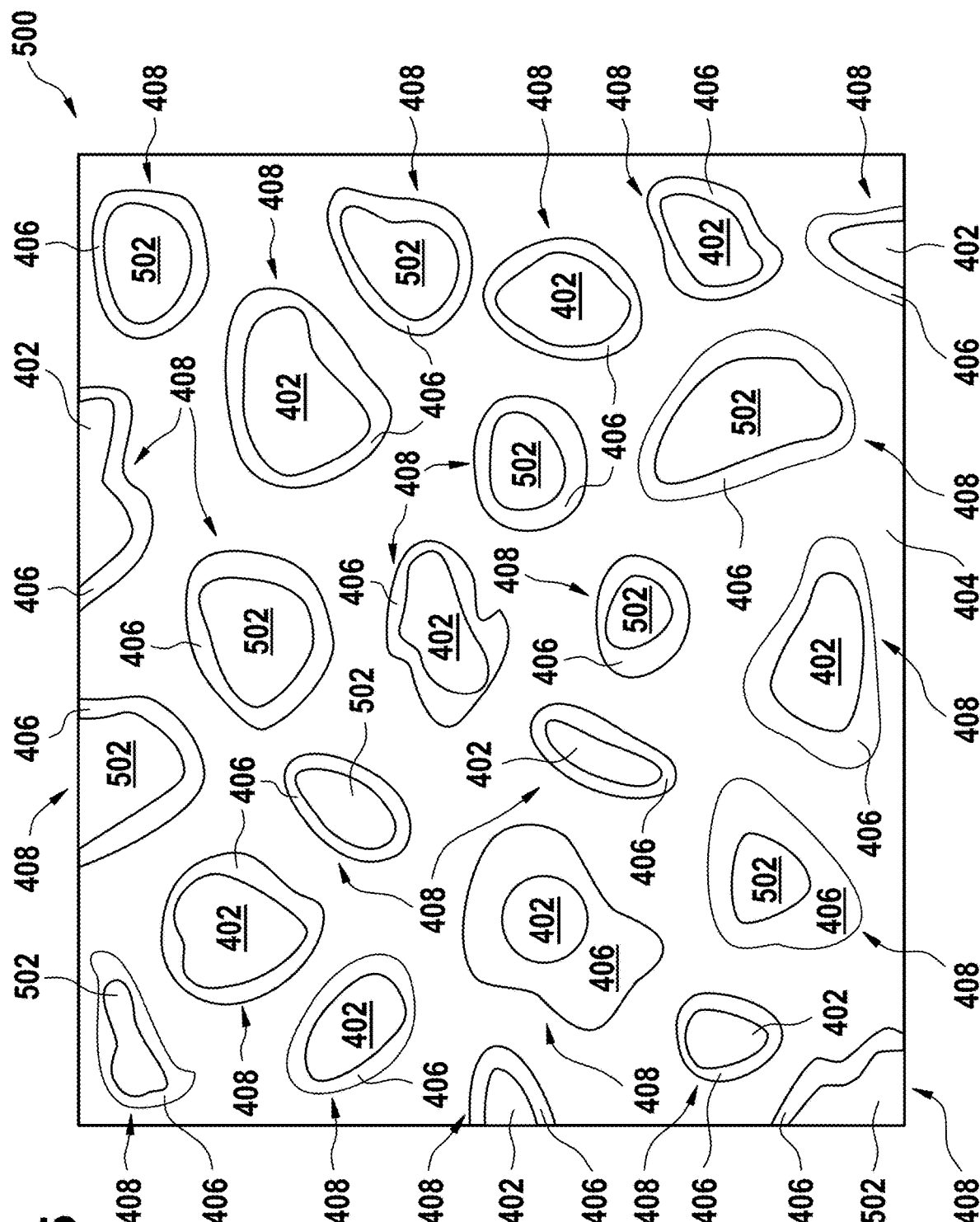
FIG. 5 shows a further example of a polymer mixture.

FIG. 5 shows a further example of a polymer mixture 500. The example shown in FIG. 5 is similar to that shown in FIG. 4 however, the polymer mixture 500 additionally comprises a third polymer 502. Some of the polymer beads 408 are now comprised of the third polymer 502. The polymer mixture 500 shown in FIG. 5 is a four-phase system. The four phases are made up of the first polymer 402, the second polymer 404, the third polymer 502, and the compatibilizer 406. The first polymer 402 and the third polymer 502 are not miscible with the second polymer 404. The compatibilizer 406 separates the first polymer 402 from the second polymer 404 and the third polymer 502 from the second polymer 404.

In this example the same compatibilizer 406 is used for both the first polymer 402 and the third polymer 502. In other examples a different compatibilizer 406 could be used for the first polymer 402 and the third polymer 502.

Figure 6:
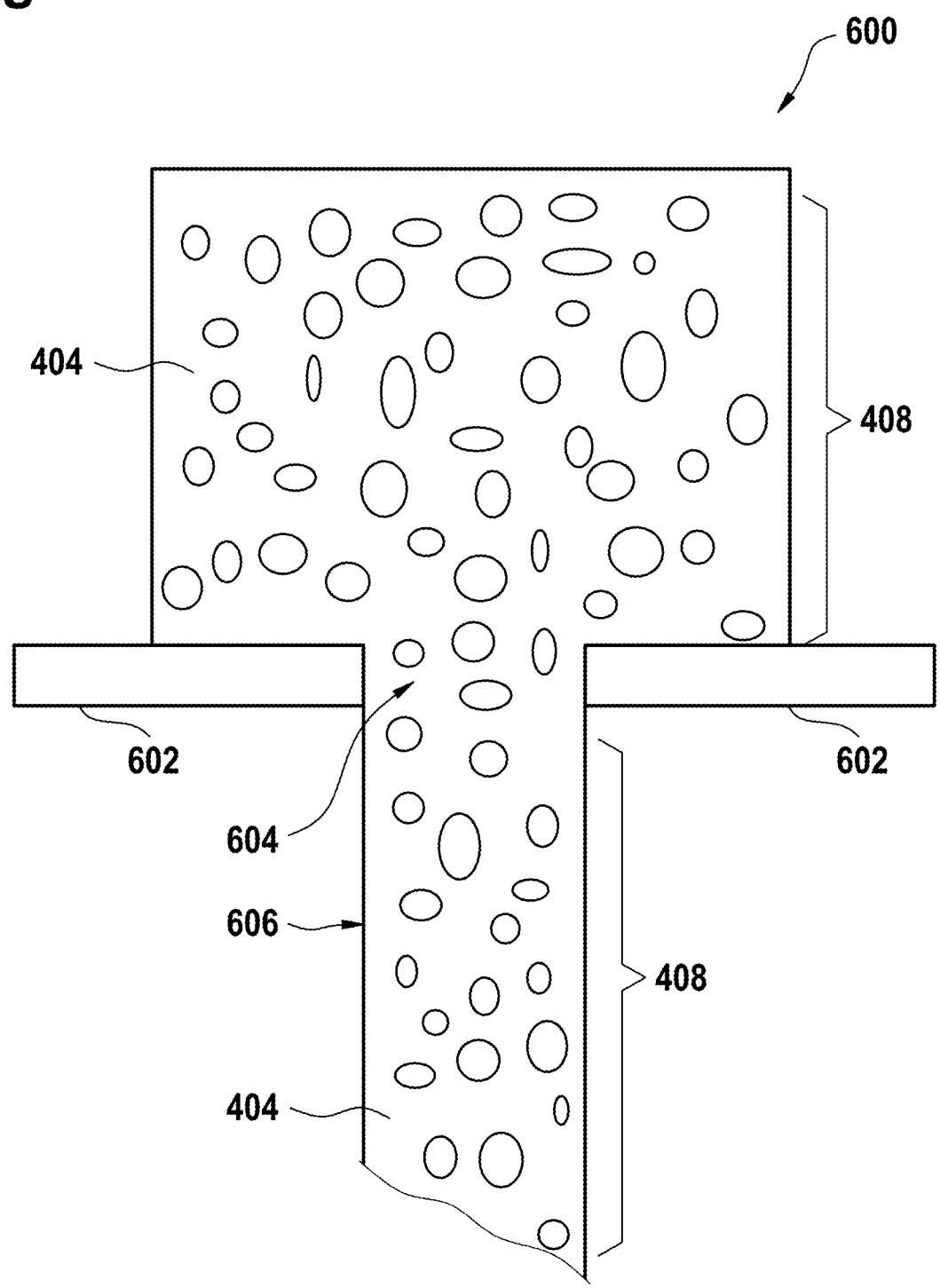
FIG. 6 illustrates the extrusion of the polymer mixture into a monofilament.

FIG. 6 illustrates the extrusion of the polymer mixture into a monofilament. Shown is an amount of polymer mixture 600. Within the polymer mixture 600 there is a large number of polymer beads 408. The polymer beads 408 may be made of one or more polymers that is not miscible with the second polymer 404 and is also separated from the second polymer 404 by a compatibilizer. A screw, piston or other device is used to force the polymer mixture 600 through a hole 604 in a plate 602. This causes the polymer mixture 600 to be extruded into a monofilament 606. The monofilament 606 is shown as containing polymer beads 408 also. The second polymer 404 and the polymer beads 408 are extruded together. In some examples the second polymer 404 will be less viscous than the polymer beads 408 and the polymer beads 408 will tend to concentrate in the center of the monofilament 606. This may lead to desirable properties for the final artificial turf fiber as this may lead to a concentration of the thread-like regions in the core region of the monofilament 606.

Figure 7:
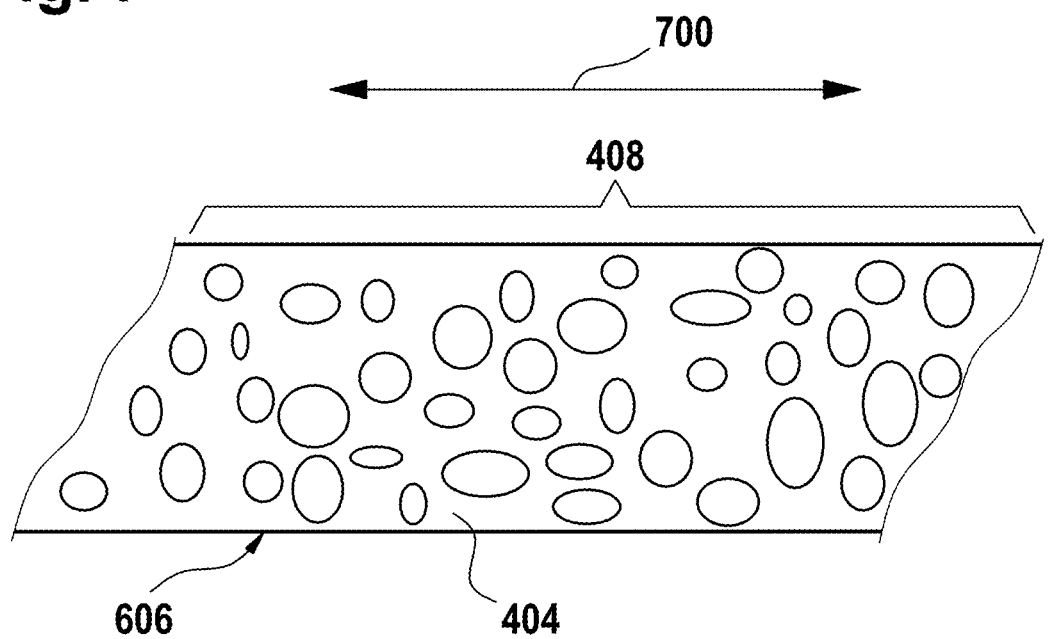
FIG. 7 shows a cross-section of a small segment of the monofilament.

FIG. 7 shows a cross-section of a small segment of the monofilament 606. The monofilament is again shown as comprising the second polymer 404 with the polymer beads 408 mixed in. The polymer beads 408 are separated from the second polymer 404 by compatibilizer 406 which is not shown. To form the thread-like structures a section of the monofilament 606 is heated and then stretched along the length of the monofilament 606. This is illustrated by the arrows 700 which show the direction of the stretching.

Figure 8:
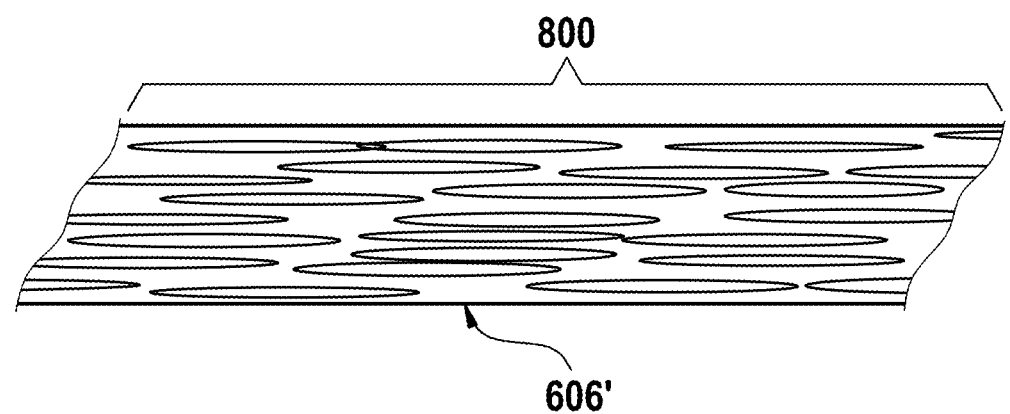
FIG. 8 illustrates the effect of stretching the monofilament.

FIG. 8 illustrates the effect of stretching the monofilament 606. In FIG. 8 an example of a cross-section of a stretched monofilament 606 is shown. The polymer beads 408 in FIG. 7 have been stretched into thread-like structures 800. The amount of deformation of the polymer beads 408 would be dependent upon how much the monofilament 606' has been stretched.

Examples may relate to the production of artificial turf which is also referred to as synthetic turf. In particular, the invention relates to the production of fibers that imitate grass. The fibers are composed of first and second polymers that are not miscible and differ in material characteristics as e.g. stiffness, density, polarity and a compatibilizer.

In a first step, a first polymer is mixed with the a compatibilizer. Color pigments, UV and thermal stabilizers, process aids and other substances that are as such known from the art can be added to the mixture. This may result in granular material which consist of a two phase system in which the first polymer is surrounded by the compatibilizer.

In a second step, a three-phase system is formed by adding the second polymer to the mixture whereby in this example the quantity of the second polymer is about 80-90 mass percent of the three-phase system, the quantities of the first polymer being 5% to 10% by mass and of the compatibilizer being 5% to 10% by mass. Using extrusion technology results in a mixture of droplets or of beads of the first polymer surrounded by the compatibilizer that is dispersed in the polymer matrix of the second polymer. In a practical implementation a so called master batch including granulate of the first polymer and the compatibilizer is formed. The master batch may also be referred to as a "polymer mixture" herein. The granulate mix is melted and a mixture of the first polymer and the compatibilizer is formed by extrusion. The resulting strands are crushed into granulate. The resultant granulate and granulate of the second polymer are then used in a second extrusion to produce the thick fiber which is then stretched into the final fiber.

The melt temperature used during extrusions is dependent upon the type of polymers and compatibilizer that is used. However the melt temperature is typically between 230° C. and 280° C.

A monofilament, which can also be referred to as a filament or fibrillated tape, is produced by feeding the mixture into an fiber producing extrusion line. The melt mixture is passing the extrusion tool, i.e., a spinneret plate or a wide slot nozzle, forming the melt flow into a filament or tape form, is quenched or cooled in a water spin bath, dried and stretched by passing rotating heated godets with different rotational speed and/or a heating oven.

The monofilament or type is then annealed online in a second step passing a further heating oven and/or set of heated godets.

By this procedure the beads or droplets of polymer 1, surrounded by the compatibilizer are stretched into longitudinal direction and form small fiber like, linear structures which stay however completely embedded into the polymer matrix of the second polymer.

Figure 9:
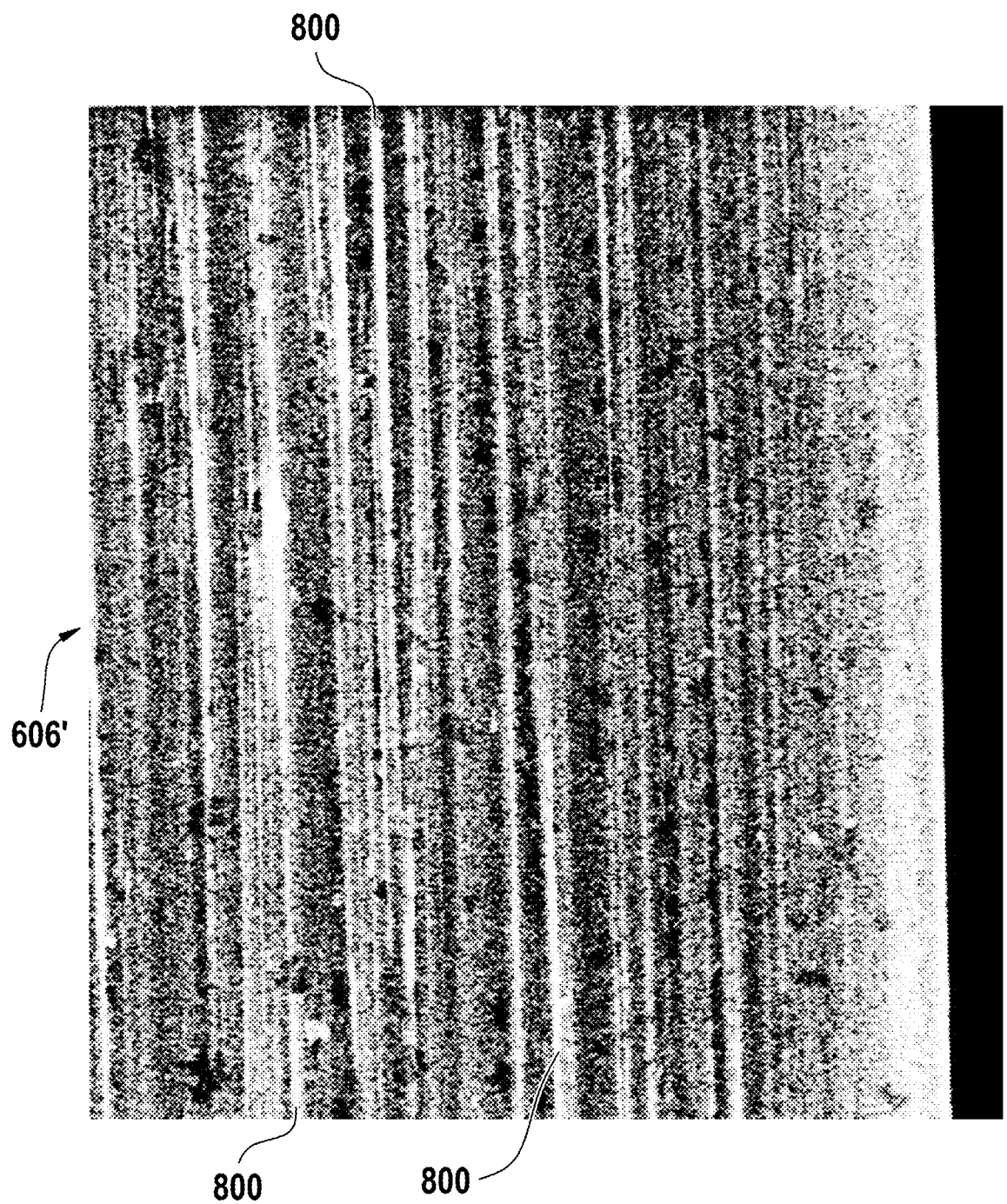
FIG. 9 shows an electron microscope picture of a cross-section of a stretched monofilament.

FIG. 9 shows a microscopic picture of a cross-section of a stretched monofilament manufactured using an example of a method described above. The horizontal white streaks within the stretched monofilament 606 are the thread-like structures 800. Several of these thread-like structures are labeled 800. The thread-like structures 800 can be shown as forming small linear structures of the first polymer within the second polymer.

The resultant fiber may have multiple advantages, namely softness combined with durability and long term elasticity. In case of different stiffness and bending properties of the polymers the fiber can show a better resilience (this means that once a fiber is stepped down it will spring back) In case of a stiff first polymer, the small linear fiber structures built in the polymer matrix are providing a polymer reinforcement of the fiber.

Delimitation due to the composite formed by the first and second polymers is prevented due to the fact that the short fibers of the second polymer are embedded in the matrix given by the first polymer. Moreover, complicated coextrusion, requiring several extrusion heads to feed one complex spinneret tool is not needed.

The first polymer can be a polar substance, such as polyamide, whereas the second polymer can be a non-polar polymer, such as polyethylene. Alternatives for the first polymer are polyethylene terephthalate (PET) or polybutylene terephthalate (PBT) for the second polymer polypropylene. Finally a material consisting of 3 polymers is possible (e.g. PET, PA and PP, with PP creating the matrix and the other creating independent from each other fibrous linear structures. The compatibilizer can be a maleic anhydride grafted on polyethylene or polyamide.

Figure 10:
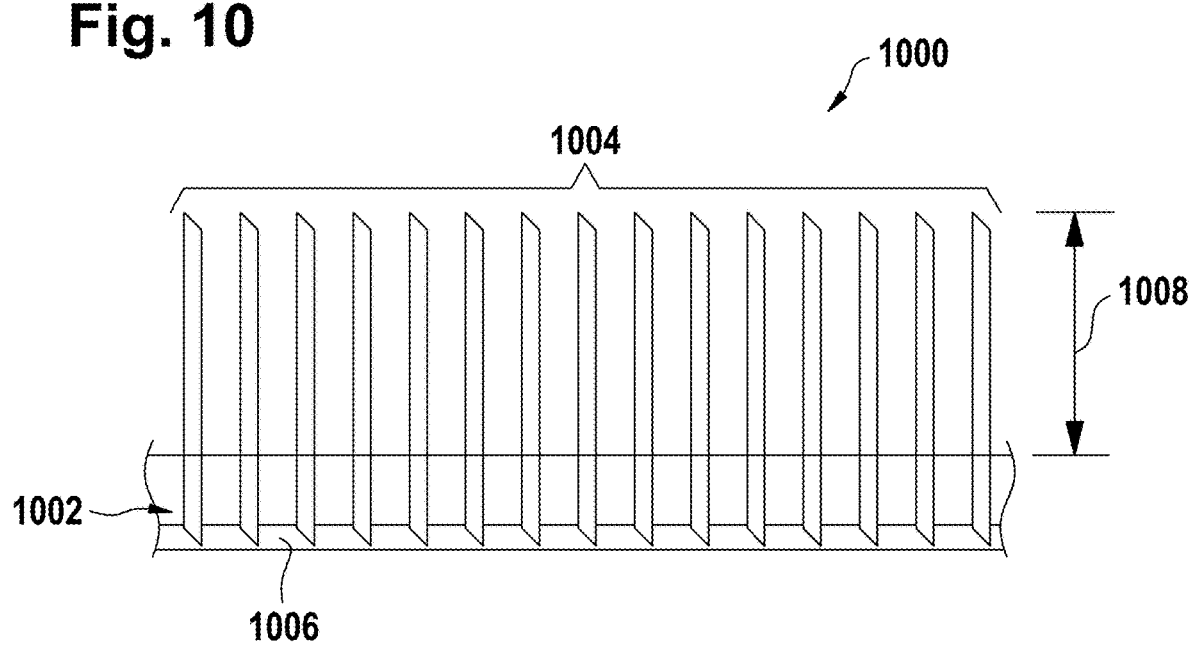
FIG. 10 shows an example of a cross-section of an example of artificial turf.

FIG. 10 shows an example of a cross-section of an example of artificial turf 1000. The artificial turf 1000 comprises an artificial turf backing 1002. Artificial turf fiber 1004 has been tufted into the artificial turf backing 1002. On the bottom of the artificial turf backing 1002 is shown a coating 1006. The coating may serve to bind or secure the artificial turf fiber 1004 to the artificial turf backing 1002. The coating 1006 may be optional. For example the artificial turf fibers 1004 may be alternatively woven into the artificial turf backing 1002. Various types of glues, coatings or adhesives could be used for the coating 1006. The artificial turf fibers 1004 are shown as extending a distance 1008 above the artificial turf backing 1002. The distance 1008 is essentially the height of the pile of the artificial turf fibers 1004. The length of the thread-like regions within the artificial turf fibers 1004 is half of the distance 1008 or less.

According to another embodiment of the present disclosure, which may be combined with one or more of the previously described embodiments, a method of manufacturing artificial turf, such as artificial turf 1000, includes creating a polymer mixture, such as polymer mixture 400, where the polymer mixture is at least a three-phase system. The polymer mixture includes a first polymer, a second polymer and a compatibilizer. The first polymer is a polyamide (PA) and the second polymer is a polyethylene (PE). The first polymer is included in an amount of 0.125 percent to 5 percent by weight, the second polymer is included in an amount of 60 percent to 97 percent by weight and the compatibilizer is included in an amount of 0.375 percent to 15 percent by weight. The first polymer and the second polymer are immiscible, and the first polymer forms polymer beads surrounded by the compatibilizer within the second polymer.

The method may further include extruding the polymer mixture into a monofilament, quenching the monofilament, reheating the monofilament, and stretching the reheated monofilament to deform the polymer beads into fibrous regions and to form the monofilament into an artificial turf fiber. The fibrous regions include the first polymer and are at least partially surrounded by the compatibilizer and separated from the second polymer by the compatibilizer. The fibrous regions are centrally located such that the fibrous regions do not delaminate after formation. The method may further include incorporating the artificial turf fiber into an artificial turf backing.

In one embodiment, the polyamide is preferably nylon (e.g., nylon 6). However, the scope of the present disclosure covers other polyamides, and may include polyamides that occur both naturally and artificially. For example, the polyamide of the present disclosure may include naturally occurring polyamides (e.g., proteins), such as wool and silk, and artificially made polyamides, such as aramids and sodium poly(aspartate), for example.

Although in a preferred embodiment, the second polymer is a polyethylene, such as a polyethylene resin produced by DOW®, the scope of the present disclosure covers other polyethylenes, such as renewable polyethylenes (i.e., polyethylenes produced/provided from renewable resources rather than fossil fuels). For example, the scope of the present disclosure includes polyethylenes produced from sugarcane, in which high-density and low-density polyethylenes are produced from bioethanol derived from sugarcane. Embodiments of the present disclosure also contemplate polyethylene made from other feedstocks, such as wheat grain and sugar beet.

Applicant has surprisingly discovered that a high compatibilizer content of the PA-PE polymer mixture, and preferably the high compatibilizer content of the PA-PE polymer mixture having a first polymer included in an amount of 0.125 percent to 5 percent by weight, a second polymer included in an amount of 60 percent to 97 percent by weight and a compatibilizer included in an amount of 0.375 percent to 15 percent by weight, advantageously changes the flow properties of the mixture, making the mass of the mixture more homogeneous, thereby making the pressure and temperature of the mixture more uniform during processing of the mixture and avoiding fluctuations in energy consumption, as well as eliminating segregation of the mixture upon and after extruding the mixture through a nozzle and/or die plate. The compatibilizer and the first polymer (e.g. polyamide) may be present in the formulation in a determined ratio of about 5 parts to 1 part (5:1 parts) to about 2:1 parts, and more preferable in a determined ratio of from about 4:1 to 2.5:1 and even more preferable in a determined ratio of about 3:1.

According to another embodiment, the compatibilizer preferably comprises an ethylene ethyl acrylate (i.e., copolymers consisting of basic resins produced by the catalytic copolymerization of ethylene and ethyl acrylate). However, the scope of the present disclosure covers other compatibilizers, such as a maleic acid anhydride as disclosed above.

Embodiments of the polymer mixture of the present disclosure include the advantageous effects of faster detachment at a nozzle and/or die plate (i.e., faster detachment upon extruding the mixture through a nozzle and/or die plate), or in other words, providing an extrusion step that generates monofilaments more efficiently and more uniformly and/or with less wasted material, and may also provide the advantageous effects of the artificial turf fiber having an increased polarity, better abrasion resistance, better elongation at break, good resilience and tensile strength, better suitability for incorporation into an artificial turf backing and/or better suitability as field hockey yarn. Furthermore, the inventive polymer mixture, including the ethylene ethyl acrylate compatibilizer, also optimizes service life of the artificial turf fiber manufacturing machinery, and in particular extends the service life and/or use of the extrusion machinery and/or components, such as nozzle and/or die plates, for example, and extends periods between cleaning of such components (e.g., extends ultrasound cleaning periods). For example, embodiments of the polymer mixture as disclosed increases the period between nozzle and/or die cleanings from 2-3 days, when using an anhydride compatibilizer, to 2-3 weeks when using a ethylene ethyl acrylate compatibilizer.

In one embodiment, the weight ratio of the compatibilizer to the first polymer is in the range of 2:1-4:1, and preferably 3:1.

In yet another embodiment, the polyethylene of the second polymer includes at least a first linear low-density polyethylene (LLDPE) and a second LLDPE. The first LLDPE has a melt flow rate from about 0.9 g/10 min to about 1.1 g/10 min as measured in accordance with DIN EN ISO 1133 190° C./2.16 kg, and the second LLDPE has a melt flow rate from about 2.2 g/10 min to about 2.4 g/10 min as measured in accordance with DIN EN ISO 1133 190° C./2.16 kg. Suitable example embodiments of LLDPE are manufactured by DOW®.

In one embodiment, the first LLDPE and the second LLDPE each have a density from about 0.90 g/cm$^3$ to about 0.93 g/cm$^3$, preferably each from about 0.91 g/cm$^3$ to about 0.925 g/cm$^3$. According to an embodiment, the first LLDPE has a density of 0.917 g/cm$^3$ and the second LLDPE has a density of 0.922 g/cm$^3$.

In another embodiment, it is preferable that the first LLDPE and the second LLDPE are present in the formulation in a determined ratio of about 1 part to 20 parts (1:20 parts) to about 1:4 parts, and more preferable in a determined ratio of from about 1:20 to 1:3 parts. The preferred ratios have the advantageous effect of reducing the separation of PA, which is important for giving the product a proper final abrasion resistance. The preferred ratios ensure that the melt flow index (MFI) of the formulation, also referred to as melt index, is close to an optimum MFI, which in one embodiment corresponds to the MFI of the second LLDPE. Reduction of separation is particularly relevant in the event of a pressure drop at the extrusion nozzle and/or die.

Table 1 shows seven sample formulations, each formulation having a particular first to second LLDPE weight ratio, a calculated MFI, a measured MFI and an accuracy between the calculated and measured MFI. The MFI for a particular sample depends upon the MFIs of the first and second LLDPE.

TABLE 1

| Sample # | Ratio | | Melt index [g/10 min] | | accuracy [%] |
| --- | --- | --- | --- | --- | --- |
| | First LLDPE | Second LLDPE | calculated | measured | |
| 1 | 100 | | 1 | 1,00 | 100 |
| 2 | | 100 | 2,3 | 2,30 | 100 |
| 3 | 24,99 | 75,01 | 1,98 | 1,98 | 100 |
| 4 | 20,02 | 79,98 | 2,04 | 1,87 | 91,9 |
| 5 | 15,03 | 84,97 | 2,10 | 2,05 | 97,6 |
| 6 | 10,01 | 89,99 | 2,17 | 2,05 | 94,5 |
| 7 | 5,03 | 94,97 | 2,23 | 2,13 | 95,3 |

In one embodiment, the weight ratio of the first LLDPE to the second LLDPE is between 1:20 and 1:3, and the melt flow index (also referred to as the melt flow rate) of the mixture of the first LLDPE and the second LLDPE is from about 1.95 g/10 min to about 2.25 g/10 min as measured in accordance with DIN EN ISO 1133 190° C./2.16 kg.

According to another embodiment, the polyethylene of the second polymer further includes a high-density polyethylene (HDPE). The HDPE has a melt flow rate from about 3.9 g/10 min to about 4.1 g/10 min as measured in accordance with DIN EN ISO 1133 190° C./2.16 kg, and the HDPE is included in an amount of 0.1 percent by weight to 15 percent by weight. Furthermore, in another embodiment, the HDPE has a density from about 0.93 g/cm$^3$ to about 0.97 g/cm$^3$, preferably from about 0.95 g/cm$^3$ to about 0.96 g/cm$^3$.

In one embodiment, the polymer mixture further includes a processing aid additive. The processing aid additive advantageously lowers the viscosity of the polymer mixture (also referred to as processing mixture melt) during processing to reduce or prevent deposits from accumulating on extruder components, such as extruder screws, extruder housing and nozzle and/or die plates. The processing aid additive may include a fluoropolymer based processing additive, a siloxane, or a combination thereof. The processing aid additive may be included in an amount of 0.1 percent by weight to 1.0 percent by weight.

Conventional processing aid additives, such as products from BYK-Altana and 3M (e.g., Dynamar®) contain long chain polyfluorinated polymers, such as long-chain polyflouroalkylated compounds. Although there are current environmental concerns about the use of short chain polyfluorinated polymers (e.g., short chain polyfluoroalkyl substances (PFAS)), it is difficult to analytically distinguish long chain polyfluorinated polymers from short chain polyfluorinated polymers, and consequently only the presence of fluorine is tested for in artificial turf fibers. When the presence of fluorine is detected, regulators typically conclude that short-chain PFASs are likely present, at least as impurities. Thus, one advantage of only using siloxane as a processing aid additive, besides having a fluorine-free formulation and fluorine-free product, is the elimination of any doubt about whether or not the formulation and product contain short chain polyfluorinated polymers, thereby alleviating any concerns that the product is detrimental to the environment.

In one preferred embodiment, the processing aid additive of the present disclosure is siloxane. In another embodiment, the siloxane is included in the polymer mixture in an amount of 0.5 wt %, resulting in a fluorine-free mixture and fiber product. In addition to addressing environmental/toxicological concerns, the use of siloxanes as a processing aid additive may also reduce deposits that can occur during processing of a PA-PE blend (i.e., mixture). Although the compatibilizer may reduce deposits, as described above, deposits may still build up on components of processing machinery, such as components associated with the extrusion process. Using only a siloxane formulation has the technical effect of increasing the die and/or nozzle life from about 24 hours to up to 72 hours.

In yet another embodiment, the polymer mixture may further include a polymer protection mixture having at least one of a hindered amine light stabilizer, an anti-oxidant, an oxygen scavenger, a third LLDPE, and/or fillers and pigments. The polymer protection mixture may be included in an amount of 3.0 percent to 15.0 percent by weight. In one embodiment, the protection mixture may be included in about 10 weight percent of the polymer mixture, and the protection mixture itself may include: (1) 14% by weight of: hindered amine light stabilizer, anti-oxidant and oxygen scavenger; (2) 45-65% by weight a third LLDPE (e.g., a polymeric carrier); and (3) 31-41% by weight fillers and pigments.

In another embodiment, the polymer mixture consists of 0.125 percent to 5 percent by weight of the first polymer, 0.375 percent to 15 percent by weight of the compatibilizer, 3 percent to 15 percent by weight of a polymer protection mixture including at least one of a hindered amine light stabilizer, an anti-oxidant, an oxygen scavenger, a third LLDPE, fillers and pigments, and 0.1 percent to 1.0 percent by weight of an processing aid additive. The processing aid additive is a fluoropolymer based processing additive, a siloxane or a combination thereof. The second polymer consists of 20 percent to 75 percent by weight of a first linear low-density polyethylene (LLDPE), where the first LLDPE has a melt flow rate from about 0.9 g/10 min to about 1.1 g/10 min as measured in accordance with DIN EN ISO 1133 190° C./2.16 kg, 5 percent to 25 percent by weight of a second LLDPE, where the second LLDPE has a melt flow rate from about 2.2 g/10 min to about 2.4 g/10 min as measured in accordance with DIN EN ISO 1133 190° C./2.16 kg, and 0.01 percent to 15 percent by weight of a high-density polyethylene (HDPE), the HDPE having a melt flow rate from about 3.9 g/10 min to about 4.1 g/10 min as measured in accordance with DIN EN ISO 1133 190° C./2.16 kg.

According to yet another embodiment, the polymer mixture consists of 0.25 percent to 2.5 percent by weight of the first polymer, 0.75 percent to 7.5 percent by weight of the compatibilizer, 4 percent to 11 percent by weight of a polymer protection mixture including at least one of a hindered amine light stabilizer, an anti-oxidant, an oxygen scavenger, a third LLDPE, fillers and pigments, and 0.15 percent to 0.75 percent by weight of an processing aid additive, where the processing aid additive is a fluoropolymer based processing additive, a siloxane or a combination thereof. The second polymer consists of 55 percent to 70 percent by weight of a first linear low-density polyethylene (LLDPE), the first LLDPE having a melt flow rate from about 0.9 g/10 min to about 1.1 g/10 min as measured in accordance with DIN EN ISO 1133 190° C./2.16 kg, 10 percent to 20 percent by weight of a second LLDPE, the second LLDPE having a melt flow rate from about 2.2 g/10 min to about 2.4 g/10 min as measured in accordance with DIN EN ISO 1133 190° C./2.16 kg, and 8 percent to 14 percent by weight of a high-density polyethylene (HDPE), the HDPE having a melt flow rate from about 3.9 g/10 min to about 4.1 g/10 min as measured in accordance with DIN EN ISO 1133 190° C./2.16 kg.

In one embodiment, the polymer beads include crystalline portions and amorphous portions, where stretching the polymer beads into fibrous (i.e., threadlike) regions causes an increase in the size of the crystalline portions relative to the amorphous portions.

In another embodiment, creating of the polymer mixture includes the steps of forming a first mixture by mixing the first polymer with the compatibilizer, heating the first mixture, extruding the first mixture, granulating the extruded first mixture, mixing the granulated first mixture with the second polymer, and heating the granulated first mixture with the second polymer to form the polymer mixture.

Figure 11:
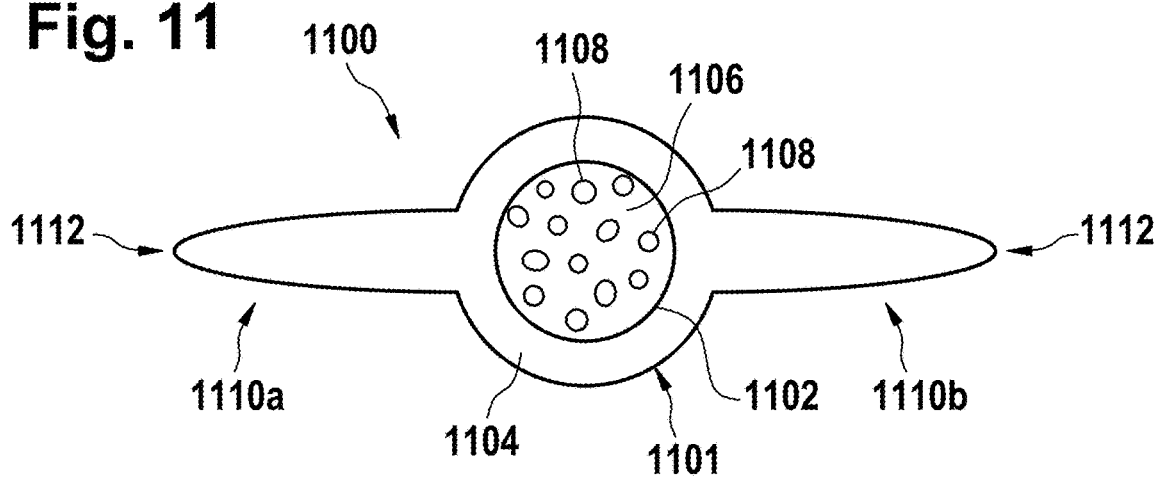
FIG. 11 shows a radial cross-section of a monofilament for producing an artificial turf fiber, according to an embodiment of the present disclosure.

FIG. 11 shows a radial cross-section of a monofilament 1100 for producing an artificial turf fiber, according to an embodiment of the present disclosure. The radial cross-section (i.e., the cut) is oriented perpendicularly with respect to a central axis of the monofilament 1100. It comprises a round bulge 1101 including a cylindrical core 1102, and a non-circular cladding 1104 surrounding the core 1102. The core 1102 comprises a core polymer 1106 and threadlike (i.e., fibrous) regions 1108 which are embedded in the core polymer 1106. The threadlike regions are formed from a thread polymer, which is preferably a polymer with a high bending rigidity or stiffness. In one embodiment, the threadlike regions are formed from the first polymer 402 (e.g., see FIG. 4). In an embodiment, the first polymer is a polyamide, preferably nylon (e.g., nylon 6). The threadlike regions permeate the core polymer 1106 in axial directions and at random radial positions and/or orientations. The core polymer 1106 makes up the majority of the core volume and may be any polymer which is miscible with a cladding polymer forming the cladding 1104. As the core polymer 1106 makes up the largest portion of the core 1102, it is preferably chosen to be a comparably inexpensive material. In one embodiment, the core polymer 1106 is the second polymer 404 (e.g., see FIG. 4). In an embodiment, the second polymer is a polyethylene (e.g., a polyethylene resin). The core polymer 1106 may be immiscible with the thread polymer 1108. In this case, and although not illustrated in FIG. 11, the fibrous regions are surrounded by a compatibilizer (as illustrated by FIG. 4 showing the compatibilizer 406 (FIG. 4) surrounding the fibrous regions 402) and have the capability to emulsify the thread polymer 1108 with the liquid core polymer 1106. In a preferred embodiment, the compatibilizer (e.g., compatibilizer 406) surrounding the fibrous regions 1108 is an ethylene ethyl acrylate. However, the scope of the present disclosure covers other compatibilizers, such as a maleic acid anhydride. After manufacturing, the threadlike regions remain cohesively coupled to the core polymer 1106 in the solidified monofilament 1100.

According to an embodiment of the present disclosure, the monofilament 1100 includes two protrusions 1110a, 1110b. The two protrusions are protrusions of the non-circular cladding 1104 surrounding the core 1102.

In another embodiment, the step of extruding the polymer mixture into a monofilament includes coextruding the polymer mixture (e.g., polymer mixture 400, FIG. 4) with a liquid cladding polymer component (not shown). Upon coextrusion, the polymer mixture forms the cylindrical core 1102 (e.g., a liquid cylindrical core) and the liquid cladding polymer component forms the cladding 1104 encompassing the core 1102.

In one embodiment, the cladding 1104 has a non-circular profile, such as the non-circular profile illustrated by FIG. 11 having two protrusions 1110a, 1110b. Although FIG. 11 shows the cladding having a non-circular profile illustrated with two opposite facing protrusions 1110a, 1110b, the scope of the present invention covers claddings having any type of non-circular profiles, including one or more protrusions. The scope of the present disclosure also covers opposite facing and/or non-opposite facing protrusions.

Figure 12:
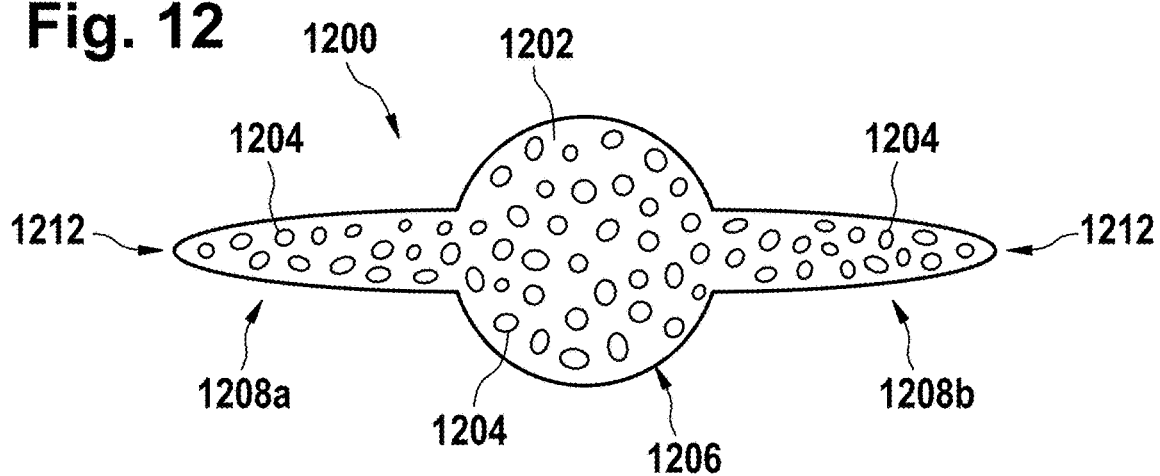
FIG. 12 shows a radial cross-section of a monofilament for producing an artificial turf fiber, according to another embodiment of the present disclosure.

In one embodiment, and as illustrated, a profile of at least one of the protrusions includes a concave side (e.g., see FIG. 12, 1210). However, the scope of the present disclosure includes protrusions or portions of protrusions having profiles with non-concave sides (e.g., convex sides or straight sides).

In one embodiment, the cladding 1104 is formed by a cladding polymer which is chosen to be miscible with the core polymer 1106 in fluid state. The cladding polymer may be identical to the core polymer 1106. The annular cylindrical zone or area where the cladding polymer contacts the core polymer 1106 is a contact layer (not shown) where both polymers are mixed with each other. Hence, the contact layer may bond core 1106 and cladding 1104 together with stronger forces than the long-range forces which occur typically within arrangements with a purely cohesive bonding.

The cladding 1104 is preferably formed by a polymer such as polyethylene which may provide a soft and smooth surface characteristic. The cladding 1104 may comprise additives which support its interfacing function to the environment and/or a user. Typical additives to the cladding 1104 may be, for example, pigments providing a specific color, a dulling agent, a UV stabilizer, flame retardant materials such as aramid fibers or intumescent additives, an anti-oxidant, a fungicide, and/or waxes increasing the softness of the cladding 1104.

Providing the cladding 1104 with additives may have the advantage that these can be left out from the core 1102. This way, a smaller content of expensive additive material per mass unit is required. As an example, it is not necessary to add pigments to the core 1102 because only the cladding 1104 is visible from the outside. By way of a more specific example, it may be beneficial to add a green pigment, a dying agent and a wax to the cladding 1104 to gain a closer resemblance of natural grass blades.

The non-circular profile of the cladding 1104 may be symmetric or irregular, polygonal, elliptic, lenticular, flat, pointed or elongated. Preferably, the cladding 1104 resembles a blade of grass by encompassing the circular-cylindrical core 1102 with two convex segments extending in two opposite directions from the geometric center of the monofilament and two protrusions 1110a, 1110b, which may be flat protrusions, extending in two further opposite directions from the geometric center of the monofilament. The convex segments and the protrusions 1110a, 1110b may be alternatingly joined by convex segments, such as convex side segments 1112. The two protrusions 1110a, 1110b, when substantially flat in comparison to the diameter of the core with surrounding cladding, may also add to the biomimetic properties of the monofilament 1110 and may increase the surface-to-mass ratio for each monofilament 1100 and, accordingly, may provide an improved surface coverage for an artificial turf manufactured from artificial turf fibers on the basis of such monofilaments 1110.

In an embodiment, the monofilament 1100, which can also be referred to as a filament, can be produced by feeding a core polymer mixture, such as polymer mixture 400, and a cladding polymer component into a fiber producing coextrusion line (not shown). The two polymer melt components are prepared separate from each other and then joined together in the coextrusion tool, i.e., a spinneret plate, forming the two melt flows into a filament which is quenched or cooled in a water spin bath, dried and stretched by passing rotating heated godets with different rotational speed and/or or a heating oven.

FIG. 12 shows a radial cross-section of a monofilament 1200 for producing an artificial turf fiber, according to another embodiment of the present disclosure. The radial cross-section (i.e., the cut) is oriented perpendicularly with respect to a central axis of the monofilament 1200. The monofilament 1200 includes a polymer 1202 and threadlike (i.e., fibrous) regions 1204 which are embedded in the polymer 1202. The threadlike regions are formed from a thread polymer, which is preferably a polymer with a high bending rigidity or stiffness. In one embodiment, the threadlike regions are formed from the first polymer 402 (e.g., see FIG. 4). In an embodiment, the first polymer is a polyamide, preferably nylon (e.g., nylon 6). The threadlike regions permeate the polymer 1202 in axial directions and at random radial positions and/or orientations. In one embodiment, the polymer 1202 is the second polymer 404 (e.g., see FIG. 4). In an embodiment, the second polymer is a polyethylene (e.g., a polyethylene resin).

The polymer 1202 may be immiscible with the thread polymer 1204. In this case, and although not illustrated in FIG. 12, the fibrous regions are surrounded by a compatibilizer (as illustrated by FIG. 4 showing the compatibilizer 406 (FIG. 4) surrounding the fibrous regions 402) and have the capability to emulsify the thread polymer 1204 with the liquid polymer 1202. In a preferred embodiment, the compatibilizer (e.g., compatibilizer 406) surrounding the fibrous regions 1204 is an ethylene ethyl acrylate. In another embodiment, the compatibilizer is a maleic acid anhydride. After manufacturing, the threadlike regions remain cohesively coupled to the polymer 1202 in the solidified monofilament 1200.

According to an embodiment of the present disclosure, the monofilament 1200 includes a round bulge 1206 and two protrusions 1208a, 1208b extending from the round bulge 1206. In one embodiment, the shape of the monofilament 1200, including the round bulge 1206 and the two protrusions 1208a, 1208b, are formed upon extrusion of the mixture through a nozzle plate or die.

In one embodiment, and as illustrated, a profile of at least one of the protrusions includes a concave side (e.g., see FIG. 12, 1210). However, the scope of the present disclosure includes protrusions or portions of protrusions having profiles with non-concave sides (e.g., convex sides or straight sides).

The profile of the monofilament 1200 may be symmetric or irregular; polygonal, elliptic, lenticular, flat, pointed or elongated. Preferably, the round bulge 1206 and the two protrusions 1208a, 1208b, which may be flat protrusions, and which extend in opposite directions from a geometric center of the monofilament, are shaped to resemble a blade of grass. The two protrusions 1208a, 1208b, when substantially flat in comparison to an approximate diameter of the round bulge 1206, may add to the biomimetic properties of the monofilament 1200 and may increase the surface-to-mass ratio for each monofilament 1200 and, accordingly, may provide an improved surface coverage for an artificial turf manufactured from artificial turf fibers on the basis of such monofilaments 1200.

Figure 13:
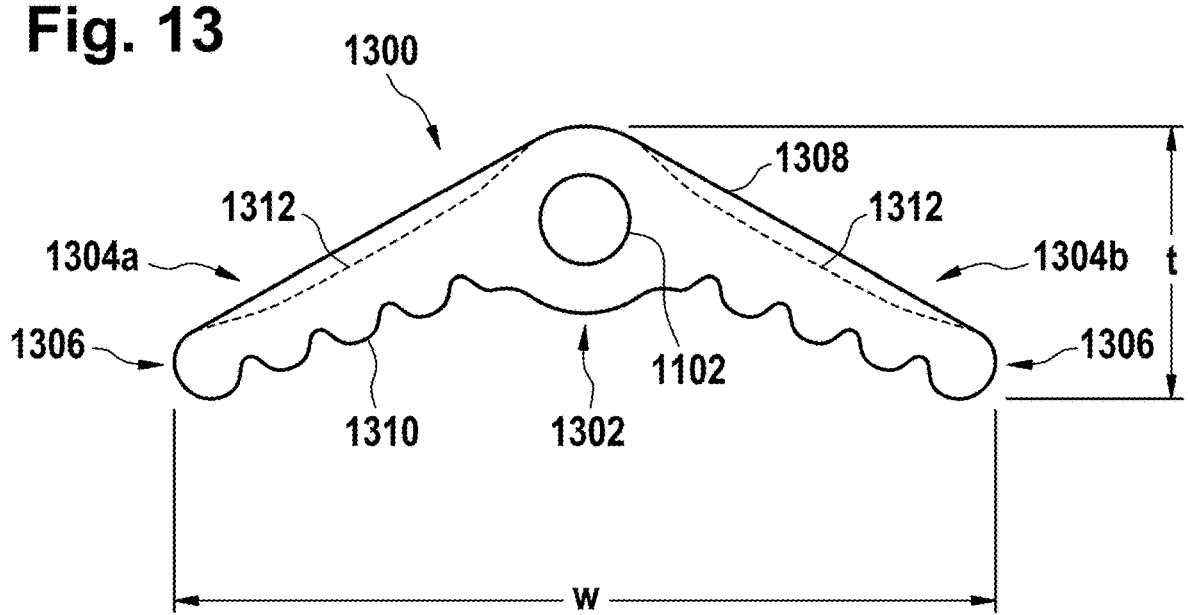
FIG. 13 shows a cross-sectional profile of an undulated artificial turf fiber, according to an embodiment of the present disclosure.

FIG. 13 shows a cross-sectional profile of an undulated artificial turf fiber 1300 comprising a round bulge 1302 at the center and two protrusions 1304a, 1304b with rounded tips 1306, according to an embodiment of the present disclosure. The round bulge 1302 may contain a core, such as cylindrical core 1102 of FIG. 11, however the scope of the present disclosure covers the round bulge 1302 not including a cylindrical core. According to one embodiment, the undulated artificial turf fiber 1300 is a undulated version of the artificial turf fiber 1100, and in another embodiment, the undulated artificial turf fiber 1300 is a undulated version of the artificial turf fiber 1200.

A profile extends over an overall thickness t between a front portion of the central bulge 1302 and the rear portion of the tips 1306 of the protrusions. The distance between the two tips 1306 is the overall width w of the fiber 1300. Both protrusions may have a profile with one straight side 1308 and, opposite to the straight side 1308, one undulated side 1310 with a plurality of notches along a straight base line. Taking into account the axial extension of the fiber (i.e., in the direction into and out of the 2d drawing), this profile corresponds to protrusions with one flat face and one grooved face. However, the scope of the present disclosure covers one or more protrusions having profiles, or portions of profiles, with straight sides 1308, undulated sides 1310, convex sides (not shown) and/or concave sides (shown as optional concave sides 1312).

The protrusions may include an angle between 100 and 180 degrees. In the non-limiting example shown, the protrusions enclose an angle of about 135 degrees towards the undulated side 1310 of the profile. Both protrusions have a radial extension of about three times the thickness of the bulge 1302. For the purpose of demonstration only, assuming an exemplary overall profile width w=1.35 mm and overall thickness t=0.45 mm, the profile of FIG. 13 has a cross-sectional area of 0.216 mm$^2$. At an exemplary average density of 0.92 g/mm$^2$, this corresponds to a yarn weight of about 2000 dtex.

In one embodiment, a profile of at least one of the protrusions includes an undulated section 1310 spanning at least 60% of one side of the protrusion.

In yet another embodiment, the coextrusion is performed at operating temperatures between 180 and 270° C.

According to another embodiment, the first polymer and the second polymer are polymers formed from renewable resources. For example, the first polymer may be a renewable polyamide (e.g., protein), such as wool and silk, and the second polymer may be a renewable polyethylene, such as a polyethylene produced from sugarcane, in which high-density and low-density polyethylenes are produced from bioethanol derived from sugarcane. Embodiments of the present disclosure also contemplate polyethylene made from other feedstocks, such as wheat grain and sugar beet.

Suitable carbon sources for renewable resources for forming the first and/or second polymers may be provided by a manufacturing process or any other natural or man-made material or process that can be used to produce the desired substance. For example, an the polymers may be made of renewable resources, such as for example poly-saccharides, such as cellulose, starch, chitosan, lignin and proteins, like wool, silk and gelatin, oils, and microbial poly (ester)s, such as PHAs. Any kind of carbon source that is used for producing a material whose $^{14}C$ atom content is similar or basically identical to the $^{14}C$ content of biomass of recently living organisms is referred to as renewable carbon source. Atmospheric $CO_2$ is the source of radioactive carbon C14. Fossil (petro-based) carbon sources comprise a lower amount of radioactive C14 isotopes and thus can be discerned from renewable (bio-based) carbon sources by performing an isotope analysis (radiocarbon dating). Roughly half of all $^{14}C$ atoms decay after 5700 years.

According to another embodiment, the present disclosure provides an artificial turf manufactured by: creating a polymer mixture, where the polymer mixture is at least a three-phase system, where the polymer mixture includes a first polymer, a second polymer and a compatibilizer, where the first polymer is a polyamide (PA) and the second polymer is a polyethylene (PE), where the first polymer is included in an amount of 0.125 percent to 5 percent by weight, the second polymer is included in an amount of 60 percent to 97 percent by weight and the compatibilizer is included in an amount of 0.375 percent to 15 percent by weight, where the first polymer and the second polymer are immiscible, and the first polymer forms polymer beads surrounded by the compatibilizer within the second polymer; extruding, quenching, reheating and stretching the polymer mixture to deform the polymer beads into fibrous regions and to form the monofilament into an artificial turf fiber; and incorporating the artificial turf fiber into an artificial turf backing. The compatibilizer preferably is an ethylene ethyl acrylate.

In one embodiment, the artificial turf fiber extends a predetermined length beyond the artificial turf backing, where the fibrous regions have a length less than one half of the predetermined length.

In another embodiment, the fibrous regions have a length less than 2 mm.

According to another embodiment, the present disclosure provides an artificial turf including: an artificial turf backing; and an artificial turf yarn including a plurality of fibers, each of the plurality of fibers including a polyamide fibrous region substantially surrounded by a compatibilizer including an ethylene ethyl acrylate and polyethylene. The compatibilizer is situated between the polyamide and the polyethylene, such that the fibrous regions are centrally located and do not delaminate.

In another embodiment, the fibrous regions have a diameter of between 1 and 3 micrometers and a length of less than 2 mm.

In another embodiment, each of the plurality of fibers includes a monofilament, where the monofilament has a diameter of 170 micrometers to 600 micrometers.

In another embodiment, artificial turf yarn includes a plurality of yarn bundles, each yarn bundle comprising several fibers of the plurality of fibers twisted together and wound with a rewinding yarn.

LIST OF REFERENCE NUMERALS 100 create a polymer mixture
102 extrude the polymer mixture into a monofilament
104 quench the monofilament
106 reheat the monofilament
108 stretch the reheated monofilament to deform the polymer beads into threadlike regions and to form the monofilament into an artificial turf fiber
110 incorporate the artificial turf fiber into an artificial turf carpet
112 optionally bind the artificial turf fibers to the artificial turf carpet
200 form a first mixture by mixing the first polymer with the compatibilizer
202 heat the first mixture
204 extrude the first mixture
206 granulate the extruded first mixture
208 mix the granulated first mixture with the second polymer
210 heat the granulated first mixture with the second polymer to form the polymer mixture
300 form a first mixture by mixing the first polymer and the third polymer with the compatibilizer
302 heat the first mixture
304 extrude the first mixture
306 granulate the extruded first mixture
308 mix the first mixture with the second polymer
310 heat the mixed first mixture with the second polymer to form the polymer mixture
400 polymer mixture
402 first polymer
404 second polymer
406 compatibilizer
408 polymer bead
500 polymer mixture
502 third polymer
600 polymer mixture
602 plate
604 hole
606 monofilament
606' stretched monofilament
700 direction of stretching
800 threadlike structures
1000 artificial turf
1002 artificial turf carpet
1004 artificial turf fiber (pile)
1006 coating
1008 height of pile
1100 monofilament
1101 round bulge
1102 core
1104 cladding
1106 core polymer
1108 fibrous region
1110 protrusion
1112 convex segment
1200 monofilament
1202 polymer
1204 fibrous region
1206 round bulge
1208 protrusion
1212 convex segment
1300 fiber
1302 round bulge
1304 protrusion
1306 tip
1308 straight side
1310 undulated side
1312 concave side

The invention claimed is:

1. A method of manufacturing artificial turf, the method comprising:
creating a polymer mixture, wherein the polymer mixture is at least a three-phase system, wherein the polymer mixture comprises a first polymer, a second polymer, and a compatibilizer, wherein the first polymer comprises polyamide and the second polymer comprises polyethylene, wherein the first polymer is included in an amount of 0.25 percent to 2.5 percent by weight, wherein the second polymer consists of:
55 percent to 70 percent by weight of a first linear low-density polyethylene (LLDPE), the first LLDPE having a melt flow rate from about 0.9 g/10 min to about 1.1 g/10 min as measured in accordance with DIN EN ISO 1133 190° C./2.16 kg,
10 percent to 20 percent by weight of a second LLDPE, the second LLDPE having a melt flow rate from about 2.2 g/10 min to about 2.4 g/10 min as measured in accordance with DIN EN ISO 1133 190° C./2.16 kg, and 8 percent to 14 percent by weight of a high-density polyethylene (HDPE), the HDPE having a melt flow rate from about 3.9 g/10 min to about 4.1 g/10 min as measured in accordance with DIN EN ISO 1133 190° C./2.16 kg, wherein the compatibilizer is included in an amount of 0.75 percent to 7.5 percent by weight, wherein the polymer mixture further comprises 4 percent to 11 percent by weight of a polymer protection mixture comprising at least one of a hindered amine light stabilizer, an anti-oxidant, an oxygen scavenger, a third LLDPE, fillers and pigments, and 0.15 percent to 0.75 percent by weight of a processing aid additive, wherein the processing aid additive comprises a fluoropolymer based processing additive or a siloxane, wherein the first polymer and the second polymer are immiscible, and wherein the first polymer forms polymer beads surrounded by the compatibilizer within the second polymer;

extruding the polymer mixture into a monofilament;

quenching the monofilament;

reheating the monofilament;

stretching the reheated monofilament to deform the polymer beads into fibrous regions and to form the monofilament into an artificial turf fiber, the fibrous regions including the first polymer, the fibrous regions being at least partially surrounded by the compatibilizer and separated from the second polymer by the compatibilizer, and the fibrous regions being centrally located such that the fibrous regions do not delaminate after formation; and incorporating the artificial turf fiber into an artificial turf backing, wherein the extruding comprises extruding the polymer mixture into the monofilament including a round bulge and two protrusions extending from the round bulge, wherein the fibrous regions are centrally located throughout the round bulge and the two protrusions.

2. The method of claim 1, wherein the compatibilizer comprises an ethylene ethyl acrylate.

3. The method of claim 1, wherein a weight ratio of the first LLDPE to the second LLDPE is between 1:20 and 1:3, and wherein the melt flow rate of the mixture of the first LLDPE and the second LLDPE is from about 1.95 g/10 min to about 2.25 g/10 min as measured in accordance with DIN EN ISO 1133 190° C./2.16 kg.

4. The method of claim 1, wherein the polymer beads comprise crystalline portions and amorphous portions, wherein stretching the polymer beads into the fibrous regions causes an increase in the size of the crystalline portions relative to the amorphous portions.

5. The method of claim 1, wherein the creating of the polymer mixture comprises:

forming a first mixture by mixing the first polymer with the compatibilizer;

heating the first mixture;

extruding the first mixture;

granulating the extruded first mixture;

mixing the granulated first mixture with the second polymer; and heating the granulated first mixture with the second polymer to form the polymer mixture.

6. The method of claim 1, wherein the first polymer and the second polymer are polymers formed from renewable resources.

7. The method of claim 1, wherein the two protrusions extend from the round bulge in opposite directions.

8. The method of claim 7, wherein a profile of at least one of the protrusions comprises a concave side.

9. An artificial turf manufactured according to the method of claim 1.

10. The artificial turf of claim 9, wherein the artificial turf fiber extends a predetermined length beyond the artificial turf backing, and wherein the fibrous regions have a length less than one half of the predetermined length.

11. An artificial turf comprising:

an artificial turf backing; and an artificial turf yarn including a plurality of fibers, each of the plurality of fibers including a round bulge, two protrusions extending from the round bulge, and a polyamide fibrous region substantially surrounded by a compatibilizer comprising an ethylene ethyl acrylate and by polyethylene, the compatibilizer being situated between the polyamide and the polyethylene such that the fibrous regions are centrally located throughout the round bulge and the two protrusions and do not delaminate, wherein the polyamide is included in an amount of 0.25 percent to 2.5 percent by weight, wherein the polyethylene consists of:

55 percent to 70 percent by weight of a first linear low-density polyethylene (LLDPE), the first LLDPE having a melt flow rate from about 0.9 g/10 min to about 1.1 g/10 min as measured in accordance with DIN EN ISO 1133 190° C./2.16 kg, 10 percent to 20 percent by weight of a second LLDPE, the second LLDPE having a melt flow rate from about 2.2 g/10 min to about 2.4 g/10 min as measured in accordance with DIN EN ISO 1133 190° C./2.16 kg, and 8 percent to 14 percent by weight of a high-density polyethylene (HDPE), the HDPE having a melt flow rate from about 3.9 g/10 min to about 4.1 g/10 min as measured in accordance with DIN EN ISO 1133 190° C./2.16 kg, wherein the compatibilizer is included in an amount of 0.75 percent to 7.5 percent by weight, wherein each of the plurality of fibers further comprises 4 percent to 11 percent by weight of a polymer protection mixture comprising at least one of a hindered amine light stabilizer, an anti-oxidant, an oxygen scavenger, a third LLDPE, fillers and pigments, and 0.15 percent to 0.75 percent by weight of a processing aid additive, wherein the processing aid additive comprises a fluoropolymer based processing additive or a siloxane.

* * * * *